US012759296B2

(12) United States Patent
Nakano et al.

(10) Patent No.: US 12,759,296 B2
(45) Date of Patent: Oct. 13, 2026

(54) LIQUID DISCHARGE MODULE, LIQUID DISCHARGE HEAD, AND LIQUID DISCHARGE APPARATUS

(71) Applicants: Toru Nakano, Kanagawa (JP); Takaya Hanada, Kanagawa (JP); Ryohta Matsufuji, Kanagawa (JP)

(72) Inventors: Toru Nakano, Kanagawa (JP); Takaya Hanada, Kanagawa (JP); Ryohta Matsufuji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 165 days.

(21) Appl. No.: 18/602,083

(22) Filed: Mar. 12, 2024

(65) Prior Publication Data

US 2024/0308219 A1 Sep. 19, 2024

(30) Foreign Application Priority Data

Mar. 15, 2023 (JP) ................................ 2023-040379

(51) Int. Cl.
*B41J 2/14* (2006.01)
*B41J 2/175* (2006.01)

(52) U.S. Cl.
CPC ......... *B41J 2/1433* (2013.01); *B41J 2/17596* (2013.01)

(58) Field of Classification Search
CPC ............................ B41J 2/1433; B41J 2/17596
See application file for complete search history.

(56) References Cited

U.S. PATENT DOCUMENTS

| | | | | |
|---|---|---|---|---|
| 4,628,330 A * | 12/1986 | Suga | B41J 2/04 347/54 |
| 5,451,993 A * | 9/1995 | Takahashi | B41J 2/1404 347/47 |
| 2004/0263579 A1 | 12/2004 | Matsufuji et al. | |
| 2005/0147423 A1 | 7/2005 | Sasaki et al. | |

(Continued)

FOREIGN PATENT DOCUMENTS

| | | |
|---|---|---|
| JP | 2018-103140 A | 7/2018 |
| JP | 2020-023177 A | 2/2020 |

(Continued)

OTHER PUBLICATIONS

Extended European Search Report issued Jul. 17, 2024 in European Patent Application No. 24162545.8, 8 pages.
U.S. Appl. No. 18/389,222, filed Nov. 14, 2023.

*Primary Examiner* — Jason S Uhlenhake
(74) *Attorney, Agent, or Firm* — XSENSUS LLP

(57) ABSTRACT

A liquid discharge module includes a nozzle plate, a housing, a valve, and a mover. The nozzle plate has a first face, a second face opposite to the first face, and a nozzle hole. The nozzle hole has at least two different inner diameters between the first face and the second face. The housing has a liquid chamber facing the first face of the nozzle plate and communicating with the nozzle hole. The housing supports the nozzle plate. The valve is disposed in the liquid chamber. The valve contacts the first face of the nozzle plate to form a sealed portion between the valve and the nozzle plate to close the nozzle hole. The mover moves the valve in a contact-separation direction between a contact position at which the valve contacts the nozzle plate and a separation position at which the valve is separated from the nozzle plate.

19 Claims, 19 Drawing Sheets

(56) References Cited

U.S. PATENT DOCUMENTS

| | | | |
|---|---|---|---|
| 2006/0028508 A1* | 2/2006 | Chen | B41J 2/1645 347/47 |
| 2006/0044364 A1 | 3/2006 | Tobita et al. | |
| 2006/0197809 A1 | 9/2006 | Tobita et al. | |
| 2010/0328409 A1 | 12/2010 | Matsufuji et al. | |
| 2013/0038651 A1 | 2/2013 | Satou et al. | |
| 2014/0354739 A1* | 12/2014 | Wallsten | B41J 2/04 347/84 |
| 2015/0077469 A1 | 3/2015 | Kohda et al. | |
| 2017/0120585 A1 | 5/2017 | Matsufuji | |
| 2017/0129245 A1 | 5/2017 | Kohda et al. | |
| 2018/0290446 A1 | 10/2018 | Kohda et al. | |
| 2019/0336990 A1* | 11/2019 | Fritz | B05B 13/0452 |
| 2020/0039217 A1 | 2/2020 | Kaiba et al. | |
| 2020/0171828 A1 | 6/2020 | Matsufuji et al. | |
| 2020/0290352 A1 | 9/2020 | Akiyama et al. | |
| 2022/0111405 A1 | 4/2022 | Maruyama et al. | |
| 2022/0379609 A1 | 12/2022 | Matsufuji et al. | |
| 2023/0302799 A1 | 9/2023 | Fujita et al. | |

FOREIGN PATENT DOCUMENTS

| | | |
|---|---|---|
| JP | 2022-064482 A | 4/2022 |
| WO | 01/42024 A1 | 6/2001 |
| WO | 2022/259063 A1 | 12/2022 |

* cited by examiner

FIG. 5A2
COMPARATIVE EXAMPLE
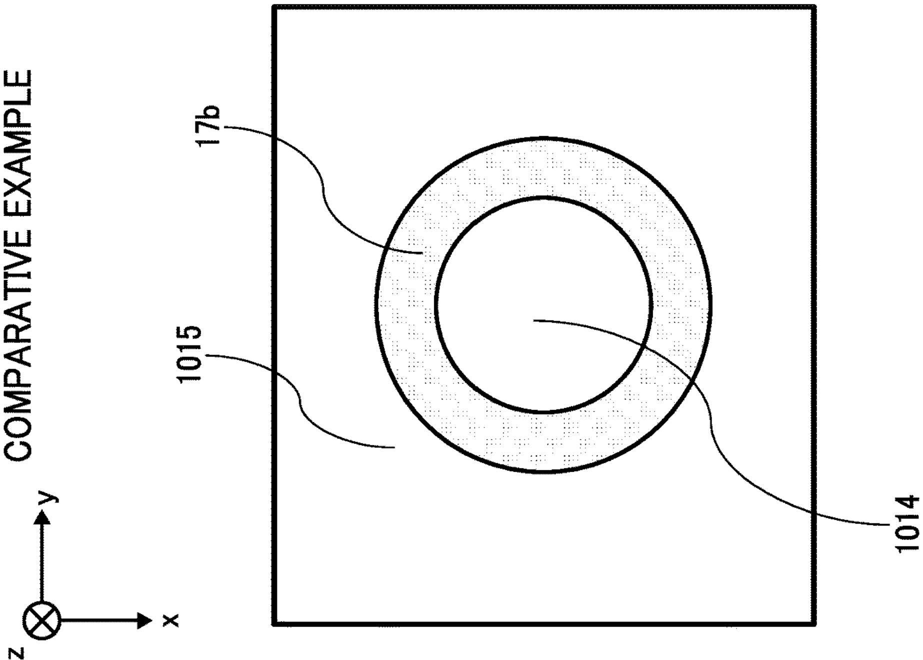
FIG. 5A1
COMPARATIVE EXAMPLE
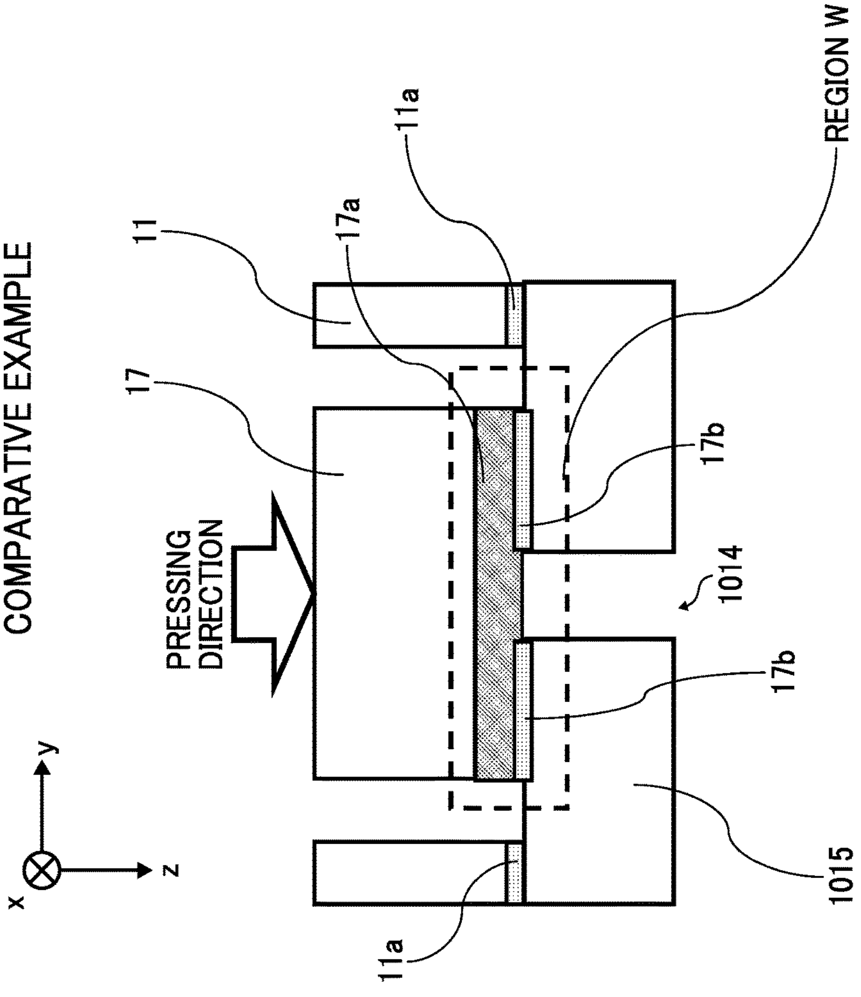

FIG. 5B COMPARATIVE EXAMPLE
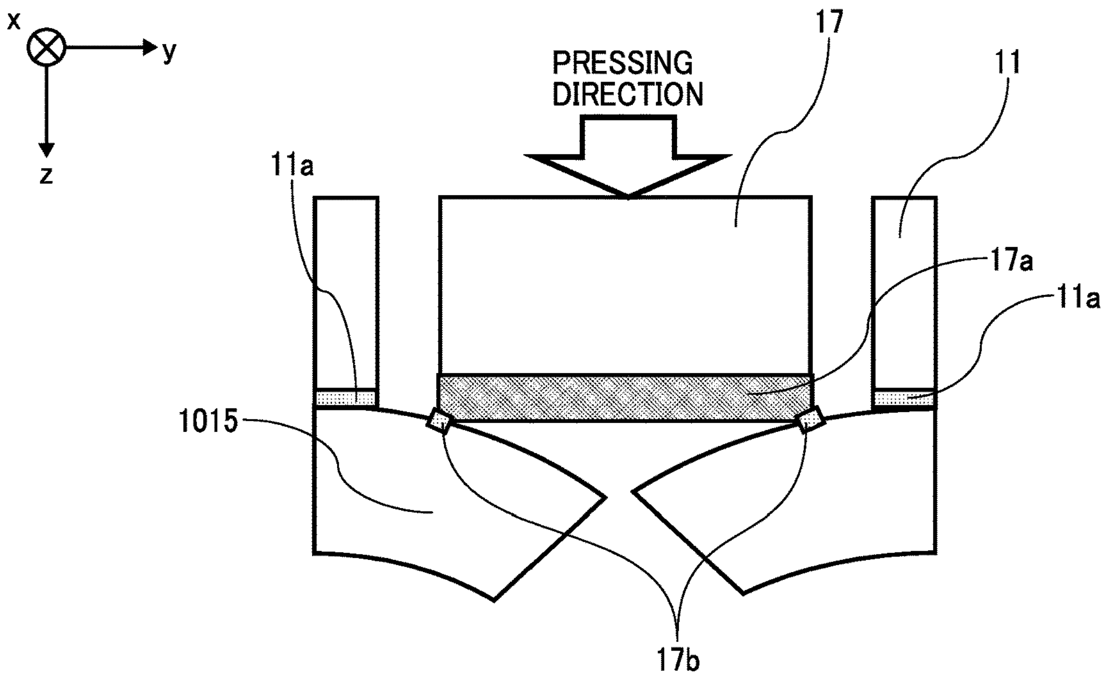
FIG. 5C COMPARATIVE EXAMPLE
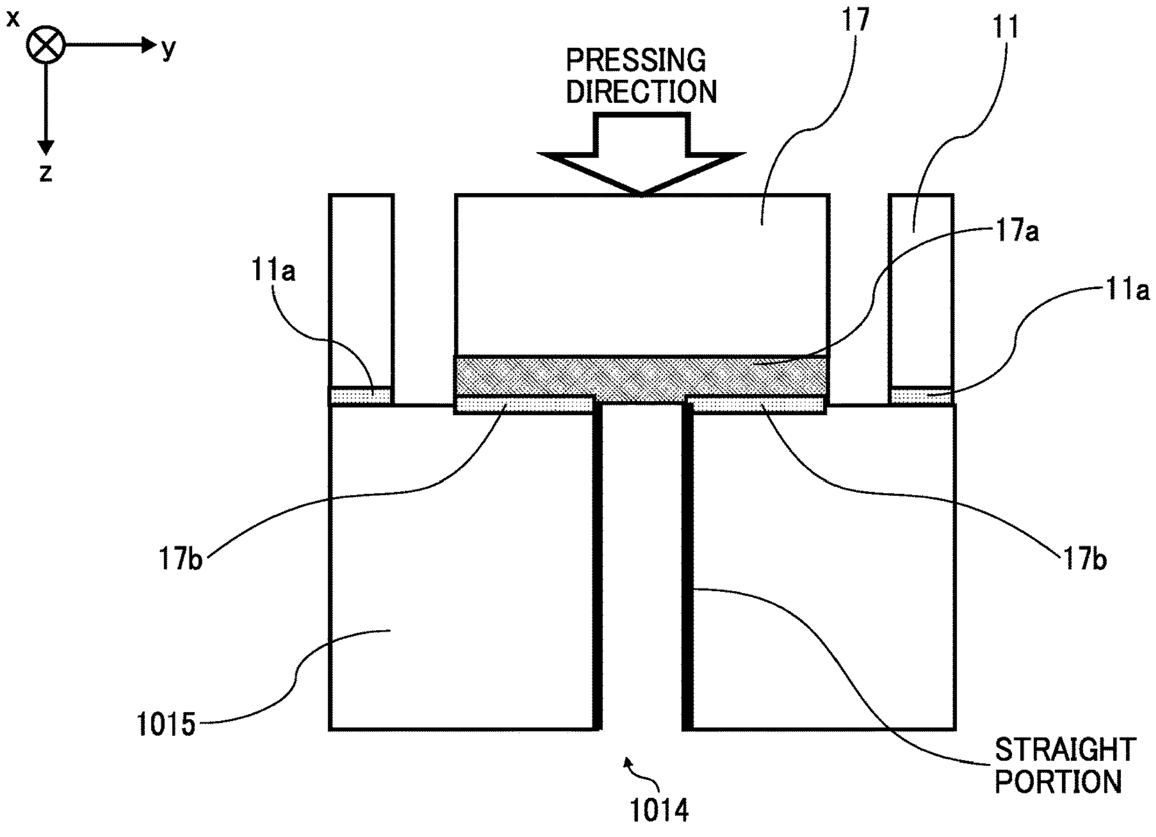

LIQUID DISCHARGE MODULE, LIQUID DISCHARGE HEAD, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-040379, filed on Mar. 15, 2023, in the Japan Patent Office, the entire disclosure of which is hereby incorporated by reference herein.

BACKGROUND

Technical Field

Embodiments of the present disclosure relate to a liquid discharge module, a liquid discharge head, and a liquid discharge apparatus.

Related Art

In the related art, a liquid discharge head discharges droplets of liquid (e.g., ink) from a nozzle. The liquid discharge head includes a nozzle opening-closing valve (i.e., a needle valve), a nozzle opening-closing driver (i.e., a piezoelectric element or an actuator), and a nozzle opening-closing controller. The needle valve is provided for the nozzle. The nozzle opening-closing driver moves the needle valve toward and away from the nozzle. The nozzle opening-closing controller controls the nozzle opening-closing driver to open and close the nozzle to discharge the droplets of the liquid from the nozzle. Such a liquid discharge head supplies liquid to be discharged to the nozzle under pressure. In this condition, the liquid discharge head causes the nozzle opening-closing valve to contact or separate from the nozzle. By so doing, the liquid that is supplied under pressure is discharged from the nozzle as liquid droplets only while the nozzle opening-closing valve is separated from the nozzle. The liquid is discharged in accordance with the pressure applied to the liquid and the gap distance between the nozzle and the nozzle opening-closing valve that separates from the nozzle, i.e., the fluid resistance in supply and the duration of opening-closing of the nozzle opening-closing valve. In the liquid discharge head of such a type, the opening-closing valve is pressed against a nozzle plate in which the nozzle is formed to close (seal) the nozzle. As a result, the liquid is prevented from being accidentally discharged.

SUMMARY

Embodiments of the present disclosure describe an improved liquid discharge module that includes a nozzle plate, a housing, a valve, and a mover. The nozzle plate has a first face, a second face opposite to the first face, and a nozzle hole through which a liquid is discharged from the second face. The nozzle hole has at least two different inner diameters between the first face and the second face. The housing has a liquid chamber facing the first face of the nozzle plate and communicating with the nozzle hole. The housing supports the nozzle plate. The valve is disposed in the liquid chamber. The valve contacts the first face of the nozzle plate to form a sealed portion between the valve and the nozzle plate to close the nozzle hole. The mover moves the valve in a contact-separation direction between a contact position at which the valve contacts the nozzle plate and a separation position at which the valve is separated from the nozzle plate.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 5A1 and 5A2 are schematic views of a liquid discharge module in which a nozzle is closed by a seal disposed at the front end of a needle valve, according to a comparative example;

FIG. 5B is a schematic view of the liquid discharge module of FIGS. 5A1 and 5A2, in which a nozzle plate is deformed by the pressing force of the needle valve, according to the comparative example;

FIG. 5C is a schematic view of a nozzle plate thicker than the nozzle plate of FIG. 5B, according to another comparative example;

Figure 1:
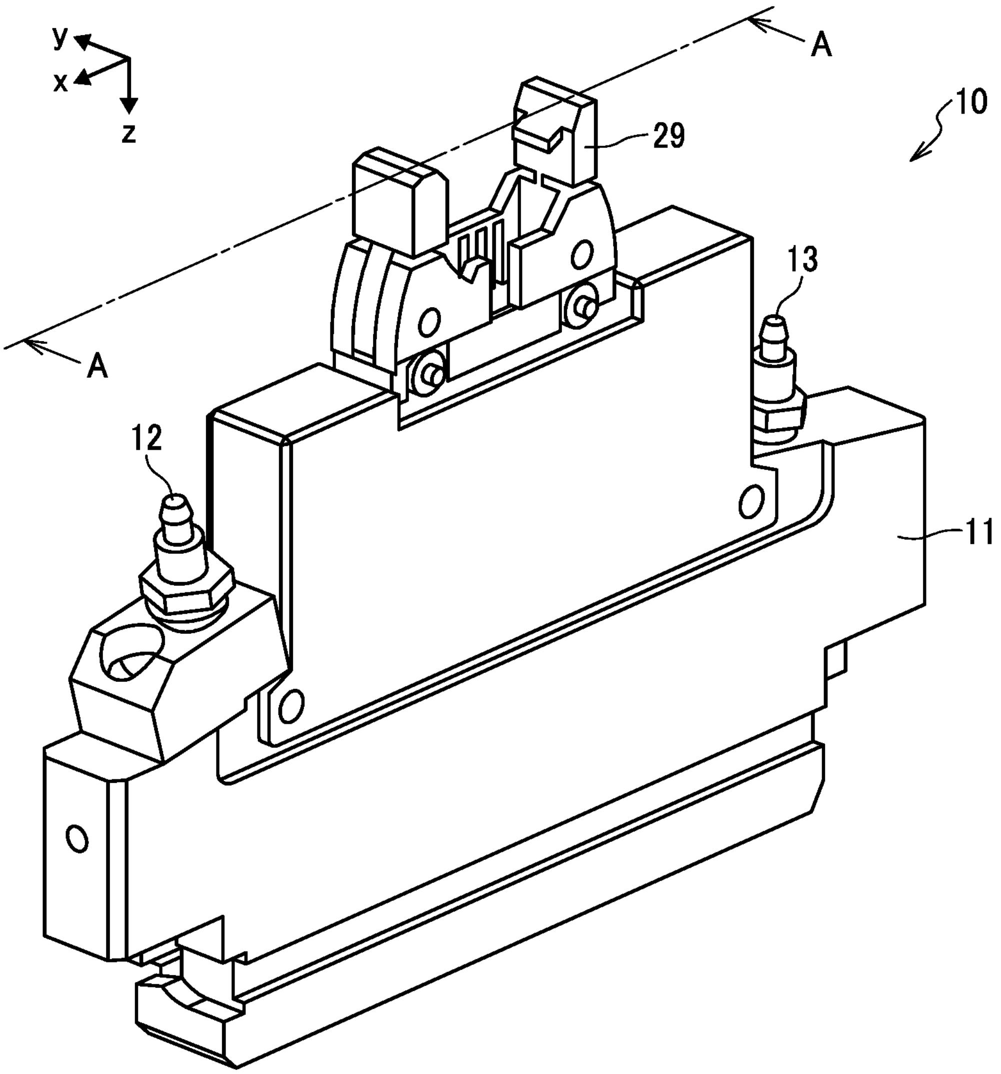
FIG. 1 is a perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with the drawings.

A drive controller according to an embodiment of the present disclosure is described below. The drive controller controls the driving of an opening-closing valve of a liquid discharge head. In the present embodiment, the liquid discharge head discharges ink as a liquid. In the present embodiment, the liquid discharge head may be referred to as a discharge head or a head.

FIG. 1 is an overall perspective view of the liquid discharge head according to the present embodiment. In FIG. 1, the width direction of the liquid discharge head (direction in which nozzles are arrayed) is defined as an x direction. The depth direction of the liquid discharge head is defined as a y direction. The height direction of the liquid discharge head (opening-closing direction of a needle valve, movement direction of the needle valve, movement direction of the needle valve for contact-separation, contact-separation direction of the needle valve, or drive direction of the needle valve) is defined as a z direction. The coordinate definitions apply to the other drawings unless otherwise specified.

A liquid discharge head 10 according to the present embodiment includes a housing 11. The housing 11 is made of metal or resin. The housing 11 includes a connector 29 for communication of electrical signals at an upper portion thereof. A supply port 12 and a collection port 13 are disposed on the left and right sides of the housing 11. Ink is supplied into the liquid discharge head 10 through the supply port 12 and drained from the liquid discharge head 10 through the collection port 13.

Figure 2:
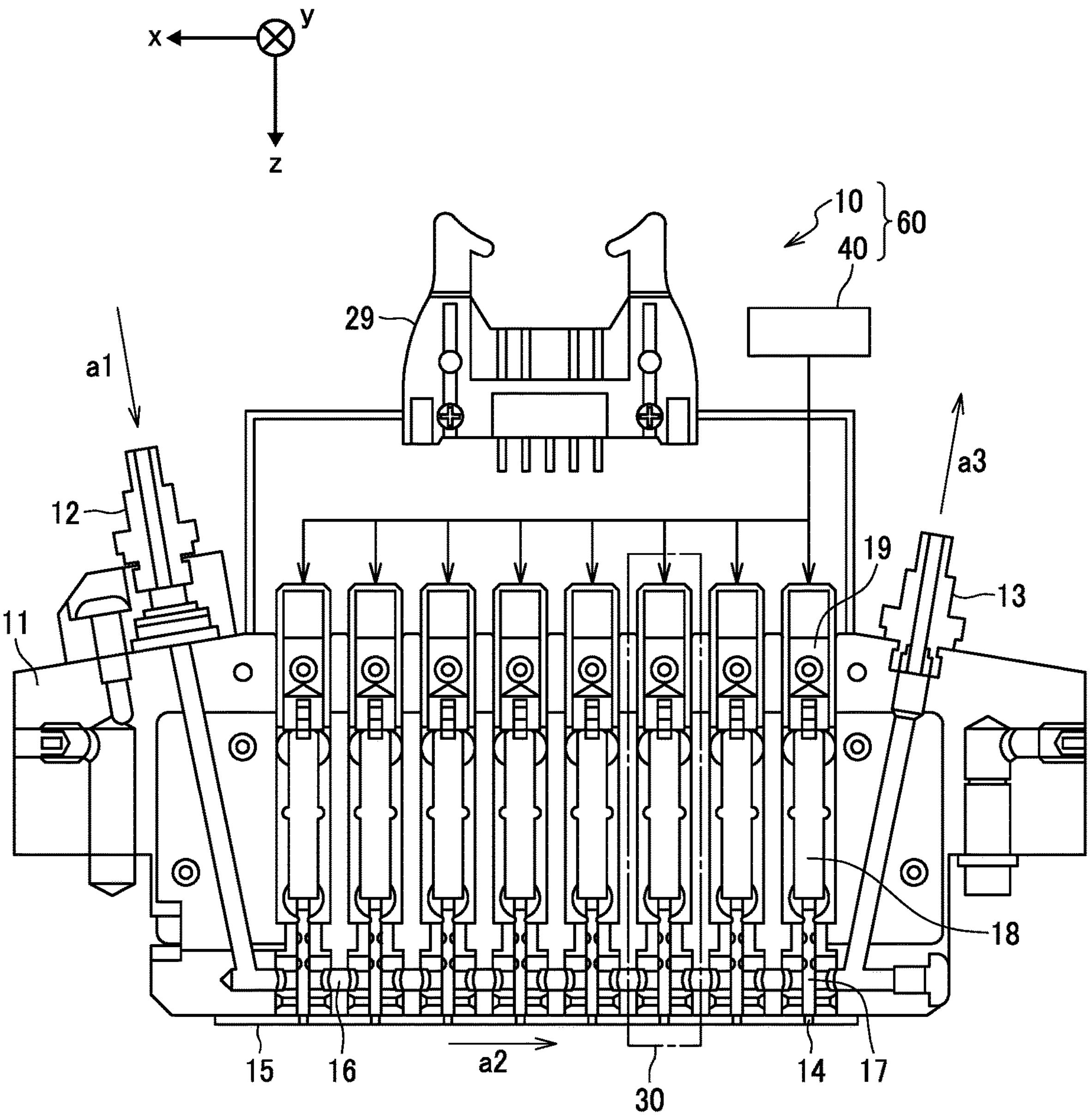
FIG. 2 is a cross-sectional view of a head unit of the liquid discharge head of FIG. 1.

FIG. 2 illustrates a head unit and is also a cross-sectional view of the liquid discharge head taken along line A-A of FIG. 1. A head unit 60 includes the liquid discharge head 10 and a drive controller 40.

The liquid discharge head 10 includes a nozzle plate 15. The nozzle plate 15 is joined to the housing 11. The nozzle plate 15 has nozzles 14 through which ink is discharged. The housing 11 includes a channel 16. The channel 16 is a flow path through which ink is fed from the supply port 12 to the collection port 13 over the nozzle plate 15. The ink is fed in the channel 16 in a direction indicated by arrows a1 to a3 in FIG. 2.

Liquid discharge modules 30 are disposed between the supply port 12 and the collection port 13. Each of the liquid discharge modules 30 discharges the ink in the channel 16 from the nozzle 14. Each of the liquid discharge modules 30 faces the corresponding nozzle 14 of the nozzle plate 15. In the present embodiment, the eight liquid discharge modules 30 correspond to the eight nozzles 14 arranged in a row, respectively. The number and arrangement of the nozzles 14 and the liquid discharge modules 30 are not limited to eight as described above. For example, the number of nozzles 14 and the number of liquid discharge modules 30 may be one instead of plural.

The numbers of nozzles 14 and liquid discharge modules 30 may be more than eight or less than eight. The nozzles 14 and the liquid discharge modules 30 may be arranged in multiple rows instead of one row.

With the above-described configuration, the supply port 12 takes in pressurized ink from the outside of the liquid discharge head 10, feeds the ink in the direction indicated by arrow a1, and supplies the ink to the channel 16. The channel 16 feeds the ink from the supply port 12 in the direction indicated by arrow a2. The collection port 13 drains the ink that is not discharged from the nozzles 14 in the direction indicated by arrow a3. The nozzles 14 are arranged along the channel 16.

The liquid discharge module 30 includes a needle valve 17 and a piezoelectric element 18. The needle valve 17 opens and closes the nozzle 14 (i.e., an opening-closing valve or a valve). The piezoelectric element 18 drives (moves) the needle valve 17.

The housing 11 includes a restrictor 19 at a position facing the upper end of the piezoelectric element 18. The restrictor 19 is in contact with the upper end of the piezoelectric element 18 and serves as a fixing point of the piezoelectric element 18.

The nozzle 14 serves as a discharge port, the nozzle plate 15 serves as a discharge port forming component, the needle valve 17 serves as the opening-closing valve (may be referred to simply as the valve), and the piezoelectric element 18 serves as a driver (mover).

As the piezoelectric element 18 is operated to move the needle valve 17 upward, the nozzle 14 that has been closed by the needle valve 17 is opened, so that ink is discharged from the nozzle 14. As the piezoelectric element 18 is operated to move the needle valve 17 downward, a leading end of the needle valve 17 comes into contact with the nozzle 14 to close the nozzle 14, so that the ink is not discharged from the nozzle 14. The liquid discharge head 10 may temporarily stop draining ink from the collection port 13 while discharging the ink to a liquid discharge target to prevent a decrease in ink discharge efficiency from the nozzles 14. In the following description, the term "opening of the nozzle" indicates when the nozzle is opened, and the term "closing of the nozzle" indicates when the nozzle is closed.

Figure 3A:
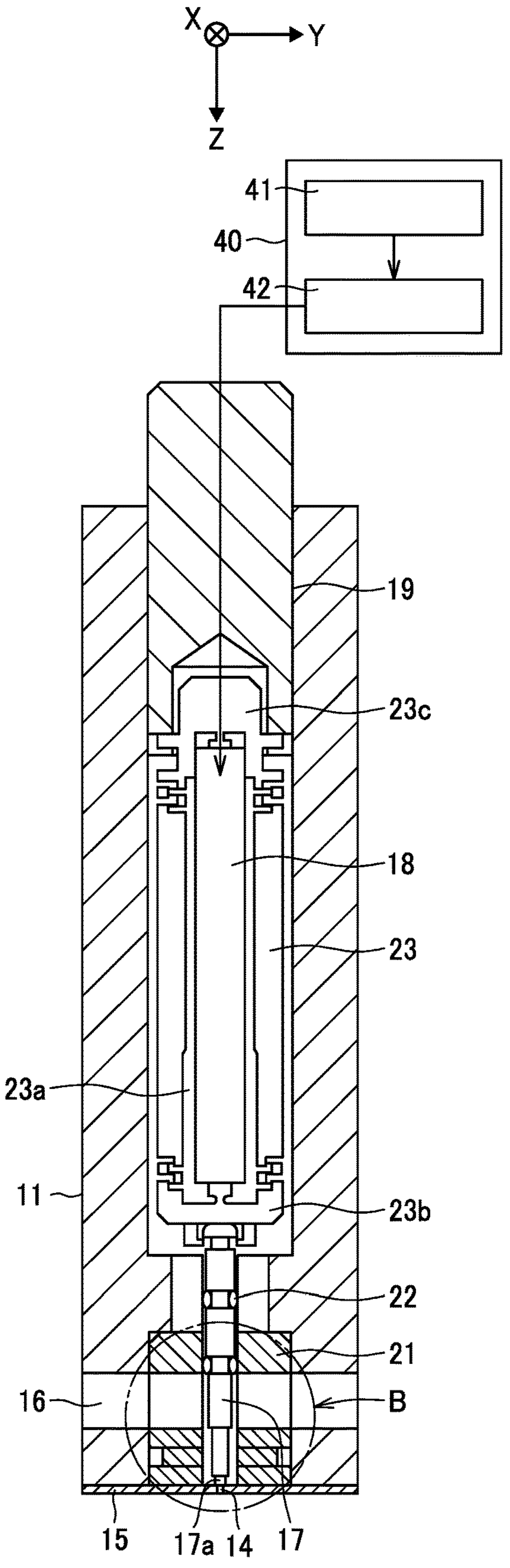
FIGS. 3A and 3B are cross-sectional views of a liquid discharge module of the liquid discharge head of FIG. 1.
Figure 3B:
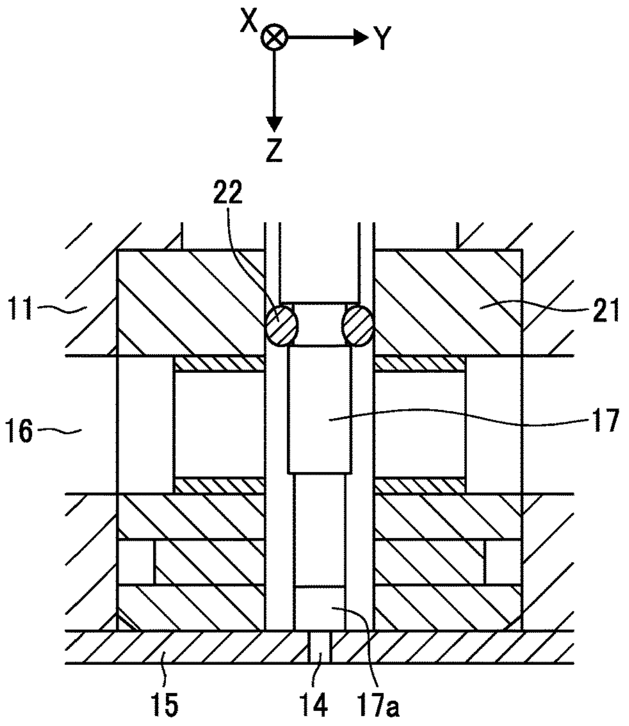

FIGS. 3A and 3B are schematic cross-sectional views of one liquid discharge module 30 of the liquid discharge head 10. FIG. 3A is an overall cross-sectional view of the liquid discharge module 30. FIG. 3B is an enlarged view of a portion B in FIG. 3A.

The channel 16 is shared with the multiple liquid discharge modules 30 in the housing 11 (see FIG. 2).

The needle valve 17 includes a seal member 17*a* formed of an elastic material (i.e., an elastic seal) at the leading end thereof. The seal member 17*a* is supported by a needle of the needle valve 17. The seal member 17*a* has a columnar (cylindrical) shape and is formed of, for example, rubber from the viewpoint of the sealing performance of the nozzle 14. A material suitable for the seal member 17*a*, which is disposed at the leading end, can be used when the needle valve 17 includes the seal member 17*a* and the needle separately, as compared to when the needle valve 17 is formed of a single material. When the leading end of the needle valve 17 is pressed against the nozzle plate 15, the seal member 17*a* is compressed. As a result, the needle valve 17 reliably closes the nozzle 14. In the present embodiment, the pressing force of the needle valve 17 is 1 N in consideration of the sealing performance. A bearing 21 is disposed between the needle valve 17 and the housing 11. A sealer 22, such as an O-ring, is disposed between the bearing 21 and the needle valve 17.

A piezoelectric element 18 is accommodated in a space inside the housing 11. A holder 23 holds the piezoelectric element 18 in a central space 23*a*. The piezoelectric element 18 and the needle valve 17 are coaxially coupled to each other via a front end 23*b* of the holder 23. The holder 23 is coupled to the needle valve 17 on the front end 23*b* side and is fixed by the restrictor 19 attached to the housing 11 on a rear end 23*c* side. When the drive controller 40 applies a voltage to the piezoelectric element 18, the piezoelectric element 18 contracts and pulls the needle valve 17 via the holder 23. Accordingly, the needle valve 17 moves away from the nozzle 14 to open the nozzle 14. As a result, pressurized ink supplied to the channel 16 is discharged from the nozzle 14. When the drive controller 40 applies no voltage to the piezoelectric element 18, the needle valve 17 closes the nozzle 14. In this state, even if the pressurized ink is supplied to the channel 16, the ink is not discharged from the nozzle 14.

The drive controller 40 includes a waveform generation circuit 41 serving as a drive pulse generator and an amplification circuit 42. The waveform generation circuit 41 generates a waveform of a drive pulse described later, and the amplification circuit 42 amplifies the voltage to a desired value. Then, the amplified voltage is applied to the piezoelectric element 18. The drive controller 40 applies the voltage to the piezoelectric element 18 to cause the piezoelectric element 18 to move the needle valve 17 to open and close the nozzle 14 so as to control a discharge operation of ink from the liquid discharge head 10. When the waveform generation circuit 41 can apply a voltage of a sufficient value, the amplification circuit 42 may be omitted from the drive controller 40.

The waveform generation circuit 41 generates the drive pulse having a waveform in which the voltage applied to the piezoelectric element 18 varies with time. The waveform generation circuit 41 receives print data from an external personal computer (PC) or a microcomputer in the drive controller 40, and generates the drive pulse based on the received print data. The waveform generation circuit 41 can change the voltage applied to the piezoelectric element 18 and generate multiple drive pulses. As described above, the waveform generation circuit 41 generates the drive pulse so that the piezoelectric element 18 expands and contracts in response to the drive pulse to move the needle valve 17 to open and close the nozzle 14.

Figure 4:
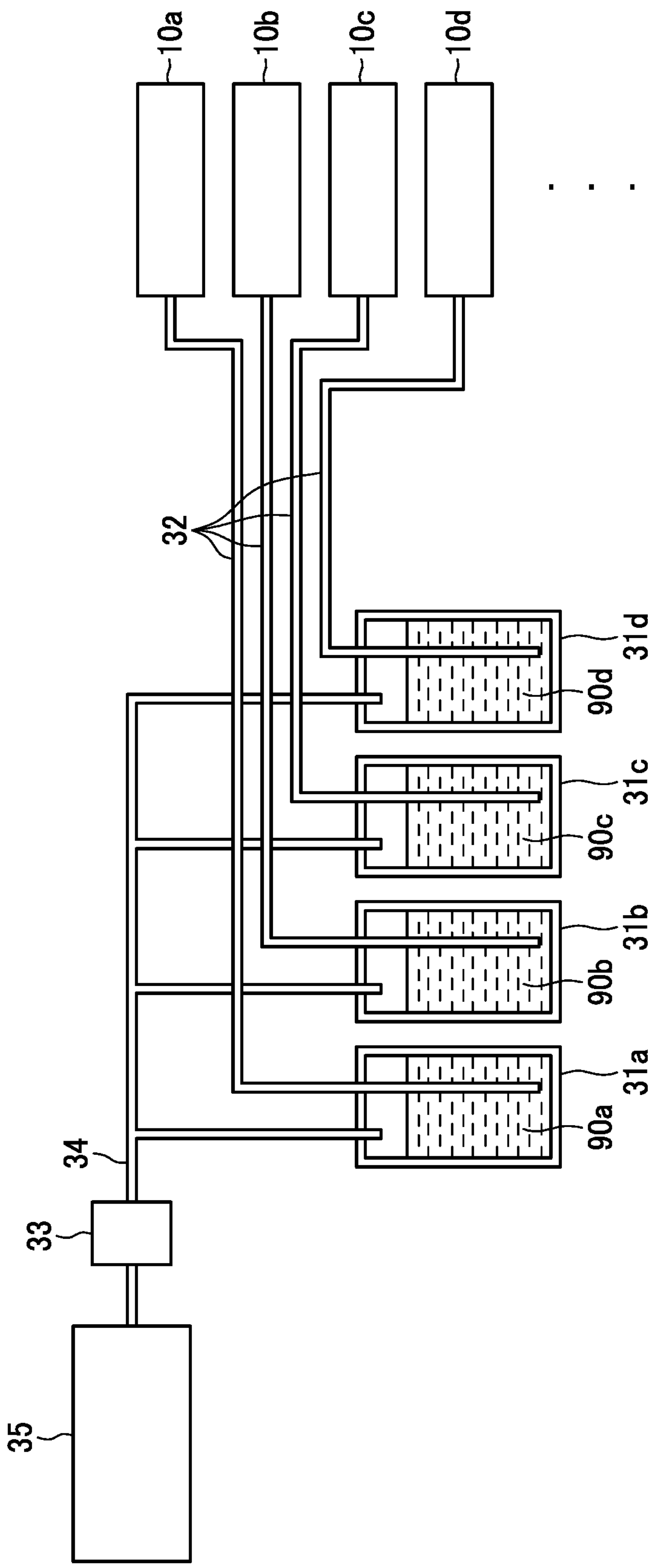
FIG. 4 is a schematic diagram illustrating a configuration of a liquid supply unit according to an embodiment of the present disclosure.

FIG. 4 is a schematic diagram illustrating a configuration of a liquid supply unit according to the present embodiment.

A liquid discharge apparatus according to the present embodiment includes tanks 31*a* to 31*d* as closed containers that store inks 90*a* to 90*d* to be discharged through liquid discharge heads 10*a* to 10*d*, respectively. In the following descriptions, the inks 90*a* to 90*d* may be collectively referred to as ink 90. The tanks 31*a* to 31*d* may be collectively referred to as tanks 31.

The tanks 31 and inlets of the liquid discharge heads 10 (i.e., the supply port 12 in FIGS. 1 and 2) are respectively connected to each other via tubes 32. The tanks 31 are coupled to a compressor 35 via a pipe 34 including an air regulator 33. The compressor 35 supplies pressurized air to the tanks 31. Thus, the ink 90 is discharged from the nozzle 14 when the needle valve 17 described above opens the nozzle 14 since the ink 90 in the liquid discharge head 10 is in a pressurized state. For example, the compressor 35, the pipe 34 including the air regulator 33, the tanks 31, and the tubes 32 collectively construct the liquid supply unit that pressurizes and supplies the ink 90 to the liquid discharge head 10.

A liquid discharge head is described below in detail. The state of the closing of the nozzle when the drive controller 40 controls the voltage to be applied to the piezoelectric element 18 is described below with reference to the drawings in which the illustrations of the nozzle 14 and the nozzle plate 15 (the portion B circled near the nozzle plate 15 in FIG. 3A) are enlarged.

Comparative Examples

Before detailed descriptions of a liquid discharge head according to embodiments of the present disclosure, comparative configurations (comparative examples) are described below. Then, embodiments of the present disclosure are described.

The comparative configurations according to the comparative examples are described below with reference to FIGS. 5A1 and 5A2 and FIGS. 5B and 5C. FIGS. 5A1 and 5A2 illustrate the closing of a nozzle when a needle valve includes a seal member at a leading end thereof according to a comparative example. The closing of the nozzle is described below with reference to FIGS. 5A1 and 5A2.

A nozzle plate and a housing are preferably independent components in terms of processing. Thus, the nozzle plate and the housing are joined to each other in an assembly process. The nozzle plate and the housing are joined with an adhesive, instead of a mechanical method such as a screw, to enhance the sealing performance to seal ink as a liquid inside the liquid chamber.

FIG. 5A1 illustrates the closing of the nozzle. During the closing of the nozzle, the seal member 17*a* (i.e., an elastic seal) at the leading end of the needle valve 17 (at the end of the needle valve 17 in the +z direction in FIG. 5A1) contacts a nozzle plate 1015 to form a sealed portion 17*b*. The needle valve 17 and the seal member 17*a* are circular in shape and a nozzle 1014 (nozzle hole) is circular in shape. Thus, the sealed portion 17*b* has a ring-shaped face having an outer circumference and an inner circumference substantially concentric with each other. FIG. 5A2 illustrates the sealed portion 17*b* formed in a region W in FIG. 5A1. FIG. 5A2 illustrates the sealed portion 17*b* viewed in the movement direction of the needle valve 17 (pressing direction and +z direction). The sealed portion 17*b* does not have the ring-shaped face having an outer circumference and an inner circumference strictly concentric with each other. This is because an axial deviation of 100 μm may occur due to the misalignment between the seal member 17*a* and the nozzle 1014, and the seal member 17*a* and the nozzle 1014 have an allowable roundness of 30 μm.

The needle valve 17 is made of metal, such as steel use stainless (SUS)304 and SUS430. The nozzle plate 1015 is made of metal, such as SUS304 and SUS430. The nozzle 1014 is formed by etching or drilling. The nozzle plate 1015 has both flat faces. The ring-shaped sealed portion 17*b* is formed during the closing of the nozzle. In consideration of the sealing performance or fluid resistance, the sealed portion 17*b* has the width of the ring-shaped face of approximately 20 to 300 μm corresponding to the difference between the inner radius and the outer radius.

FIG. 5B is a schematic view of the liquid discharge module of FIGS. 5A1 and 5A2, in which the nozzle plate 1015 is deformed by the pressing force of the needle valve 17, according to the comparative example. Referring to FIG. 5B, due to strong pressing force from the needle valve 17, the nozzle plate 1015 is deformed (bent) in the direction to discharge ink. A smaller contact area between the seal member 17*a* and the nozzle plate 1015 due to such deformation may lead to a deterioration in sealing performance, causing ink to leak. Even if ink does not leak, the deformation of the nozzle plate 1015 may cause liquid to be discharged obliquely (i.e., deterioration in discharging performance). With the configuration in which the needle valve 17 opens and closes the nozzle, the needle valve 17 is pressed against the nozzle plate 1015 with strong pressing force to firmly close the nozzle. However, the strong pressing force may cause the deterioration in sealing performance due to the deformation of the nozzle plate 1015.

For example, a thicker nozzle plate prevents such deformation described above. The thicker nozzle plate is described below with reference to FIG. 5C. FIG. 5C illustrates a liquid discharge module including a thicker nozzle plate. The nozzle plate in FIG. 5C is thicker than the nozzle plate in FIG. 5A1. The nozzle plate 1015 having a large thickness at the contact portion with the needle valve 17 can be prevented from being deformed by the pressing force of the needle valve 17.

However, the nozzle 1014 as a discharge path in FIG. 5C is longer than the nozzle 1014 in FIG. 5A1.

The nozzle 1014 is straight in shape. An increase in the length of the straight portion of the nozzle 1014 increases fluid resistance. Thus, the desired discharging performance may not be obtained. For example, a predetermined amount of liquid droplet may not be discharged.

When a liquid discharge head discharges a liquid from the nozzle (nozzle hole), the opening-closing valve (needle valve) contacts and separates from the nozzle to open and close the nozzle. The opening-closing valve repeatedly presses the nozzle plate. In the present embodiment, both the prevention of deformation of the nozzle plate and the desired discharging performance are achieved. The configuration of a liquid discharge module according to an embodiment of the present disclosure is described below.

First Embodiment

Figure 6A:
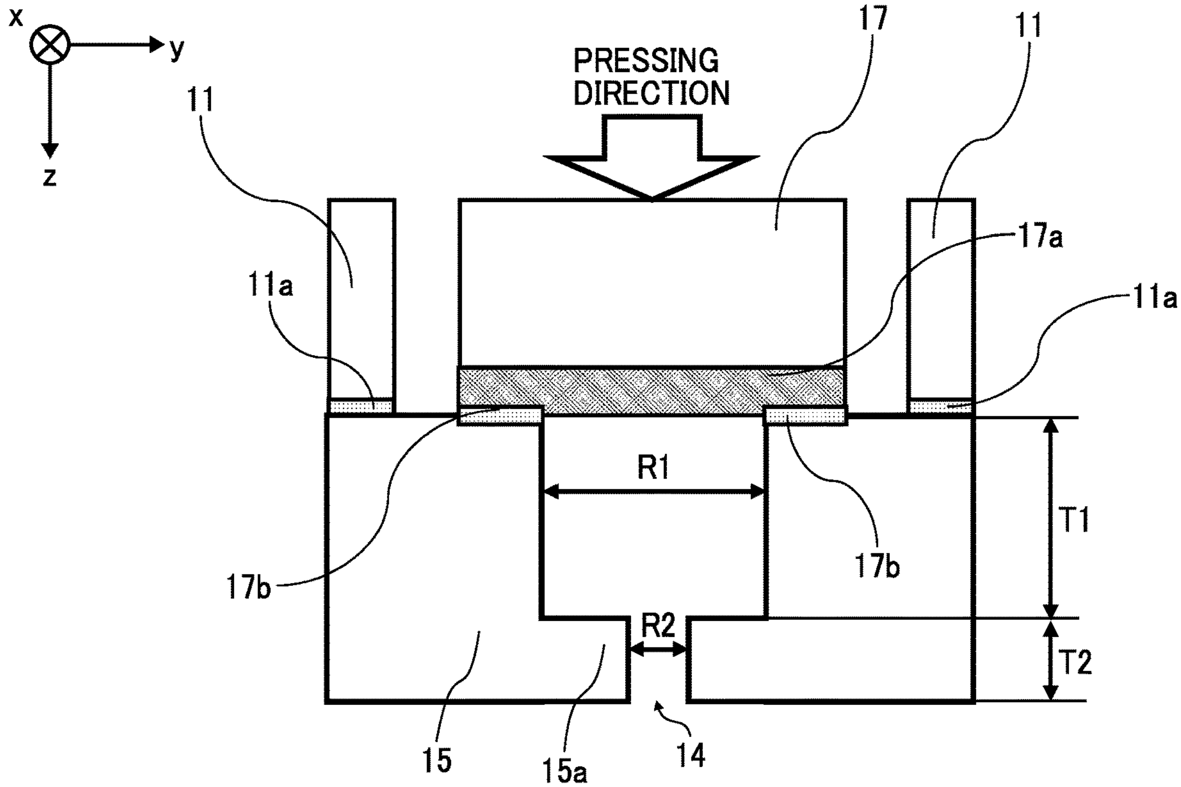
FIG. 6A is a schematic view of a liquid discharge module according to a first embodiment of the present disclosure.
Figure 6B:
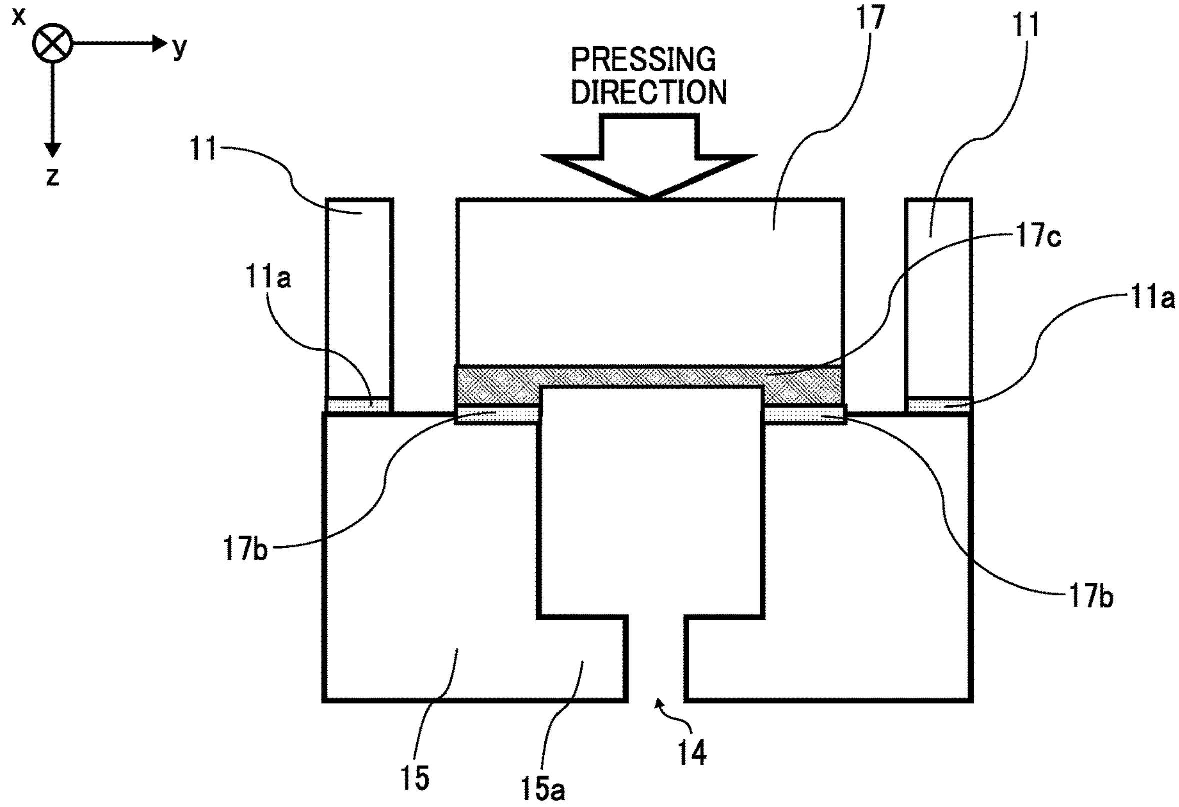
FIG. 6B is a schematic view of a liquid discharge module according to a modification of the first embodiment of the present disclosure.
Figure 6C:
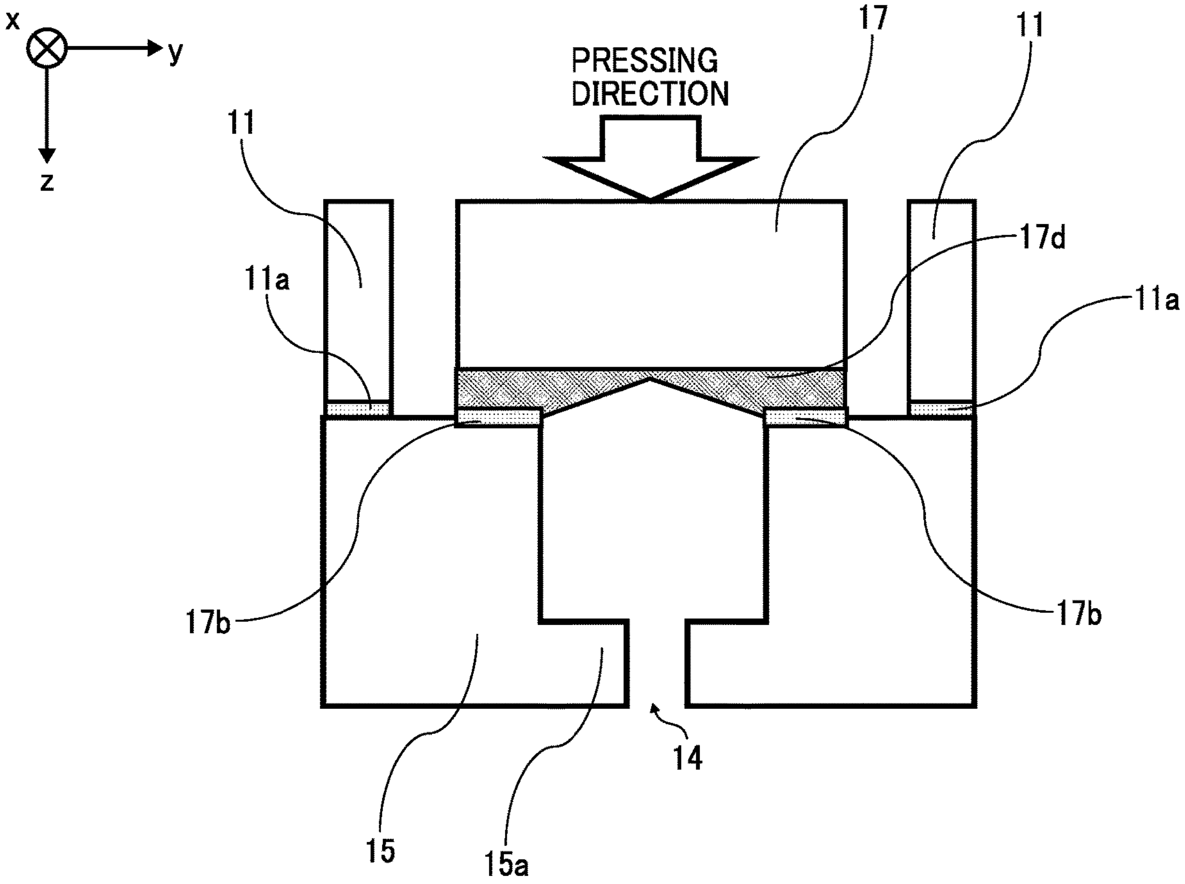
FIG. 6C is a schematic view of a liquid discharge module according to another modification of the first embodiment of the present disclosure.

FIGS. 6A to 6C illustrate the liquid discharge module according to the present embodiment. The liquid discharge module according to the present embodiment is described below with reference to FIGS. 6A to 6C.

In the present embodiment, in the portion near the nozzle 14 in the liquid discharge module 30 (the portion B in FIG. 3A), the nozzle plate has a step to form a stepped nozzle as illustrated in FIGS. 6A to 6C. Such a configuration is described below in detail. The portions other than the portion near the nozzle 14 in the liquid discharge module 30 have the same configuration as the comparative example.

FIG. 6A is a schematic view of a liquid discharge module according to a first embodiment of the present disclosure. The liquid discharge head 10 according to the present embodiment includes a nozzle plate 15 having a step 15*a* to form the stepped hole of the nozzle 14. In other words, the nozzle 14 has two spaces different in the inner diameter between the part of the nozzle plate 15 on the liquid chamber side and the part of the nozzle plate 15 on the discharge side. In other words, the nozzle plate 15 has a first face facing the liquid chamber and a second face opposite to the first face. Liquid is discharged from the second face of the nozzle plate 15. The nozzle 14 (nozzle hole) has two different inner diameters between the first face and the second face. In the present embodiment, the nozzle 14 may have three or more spaces different in the inner diameter.

The nozzle 14 in FIG. 6A has two spaces different in the inner diameter. An inner diameter R1 on the liquid chamber side (i.e., a second inner diameter) is larger than an inner diameter R2 on the discharge side (i.e., a first inner diameter), i.e., R1>R2.

The nozzle hole having a longer straight portion with a small inner diameter increases the fluid resistance and deteriorates the flowability. The nozzle hole having an excessively large inner diameter causes liquid to be excessively discharged. Accordingly, in the present embodiment, the nozzle hole has a step (i.e., the stepped nozzle) so that liquid flows smoothly and is not excessively discharged on the discharge side. The configuration according to the present embodiment is described below more specifically. The space having a large inner diameter on the liquid chamber side of the nozzle 14 (the portion from the contact face between the nozzle plate 15 and the seal member 17*a* to the step 15*a*) reduces the fluid resistance so that liquid flows smoothly. The space having a small inner diameter on the discharge side of the nozzle 14 (the portion of the step 15*a*) regulates the amount of liquid to be discharged and increases the discharge velocity due to the relation between the flow rate and the cross-sectional area of the nozzle 14. With the nozzle hole having the step, the fluid resistance can be reduced such that liquid flows smoothly, and the discharge velocity can be increased.

In the present embodiment, for example, the inner diameter R1 is set to 250 μm, and the inner diameter R2 is set to 10 to 80 μm, but the inner diameters R1 and R2 are not limited thereto.

The inner wall of the space having the large inner diameter on the liquid chamber side of the nozzle 14 and the inner wall of the space having the small inner diameter on the discharge side of the nozzle 14 are both parallel to the movement direction of the needle valve 17 (z direction). A length T1 of the inner wall of the space having the large inner diameter on the liquid chamber side of the nozzle 14 (thickness from the contact face between the nozzle plate 15 and the seal member 17*a* to the step 15*a*) is longer than a length T2 of the inner wall of the space having the small inner diameter on the discharge side of the nozzle 14 (thickness of the step 15*a*) in the contact-separation direction (movement direction of the needle valve 17), i.e., T1>T2. The total thickness of the nozzle plate 15 is the sum of the length T1 and the length T2.

In the present embodiment, for example, the length T1 is 0.4 mm, the length T2 is 0.05 to 0.1 mm, and the total thickness (T1+T2) of the nozzle plate 15 is 0.45 to 0.5 mm, but the lengths T1 and T2 are not limited thereto.

The sealed portion 17*b* is formed at the portion of the nozzle plate 15 having a large thickness. The sealed portion 17*b* is the contact portion at which the seal member 17*a* attached to the leading end of the needle valve 17 (the end of the needle valve 17 in the +z direction of the pressing direction) contacts the nozzle plate 15. In other words, the sealed portion 17*b* is formed outside the inner circumference of the space having the largest inner diameter of the nozzle 14. In other words, the sealed portion on the first face is disposed away from the nozzle hole on the second face for a predetermined distance. The predetermined distance is equal to the sum of the length T1 and the length T2, for example, 0.45 to 0.5 mm, to prevent the deformation of the nozzle plate 15.

At the sealed portion 17*b*, the nozzle plate 15 is thick to increase the rigidity of the nozzle plate 15. Thus, the nozzle plate 15 is less likely to be deformed by the pressing force from the needle valve 17. As a result, the deterioration in sealing performance to seal ink as a liquid inside the liquid chamber (i.e., ink sealing performance), due to deformation of the nozzle plate 15, can be prevented. Since the nozzle plate 15 is less likely to be deformed, ink is prevented from being obliquely discharged. Accordingly, the desired discharging performance (the discharge velocity and the amount of droplet discharging) can be achieved.

The seal member 17*a* attached to the leading end of the needle valve 17 is preferably processed to reduce the contact area with the nozzle plate 15 so as to minimize the deformation of the nozzle plate 15. Modifications of the seal member 17*a* are described below.

FIG. 6B is a schematic view of a liquid discharge module according to a modification of the first embodiment of the present disclosure. Specifically, in the present embodiment, a sealing member 17*c*, which is a columnar (cylindrical) rubber bonded to the leading end of the needle valve 17, is processed (counterbored) to form a recess (cylindrical flat-bottomed hole) at the center of the sealing member 17*c*. With such a configuration, the fluid resistance can be reduced during the opening of the nozzle 14. Thus, the sealed portion 17*b*, which is the contact portion between the sealing member 17*c* and the nozzle plate 15, can be formed outside the inner circumference of the space having the largest inner diameter of the nozzle 14. With such a configuration, the sealed portion 17*b* is formed at the portion of the nozzle plate 15 having the large thickness. As a result, the deformation of the nozzle plate 15 can be further prevented.

In the present embodiment, the volume of the recess is larger than the corresponding volume of a recess in a configuration illustrated in FIG. 6C, which is described below. Thus, the recess in FIG. 6B more effectively reduces the fluid resistance than the recess in FIG. 6C.

FIG. 6C is a schematic view of a liquid discharge module according to another modification of the first embodiment of the present disclosure. Specifically, in the present embodiment, a sealing member 17*d* has the recess having a slope slanting to the center of the sealing member 17*d*. In the present embodiment, with the recess illustrated in FIG. 6C, the fluid resistance can be reduced during the opening of the nozzle 14 similarly to the configuration in FIG. 6B. Thus, the sealed portion 17*b*, which is the contact portion between the sealing member 17*d* and the nozzle plate 15, can be formed outside the inner circumference of the space having the largest inner diameter of the nozzle 14. With such a configuration, the sealed portion 17*b* is formed at the portion of the nozzle plate 15 having the large thickness. As a result, the deformation of the nozzle plate 15 can be further prevented.

In the present embodiment, the recess, which has the shape fitting the shape of a drill, can be formed by the drill without further processing. Thus, the amount of works for processing can be reduced, and the fluid resistance can be reduced. The recess in FIG. 6C can be formed with the amount of works for processing smaller than that for the recess in FIG. 6B.

Second Embodiment

A liquid discharge module according to a second embodiment of the present disclosure is described below. Before descriptions of a configuration according to the second embodiment, the mechanism of deformation of the nozzle plate due to the distance between the housing and the needle valve is described below with reference to FIGS. 7A and 7B. In the present embodiment, the housing has a side wall defining the liquid chamber.

Figure 7B:
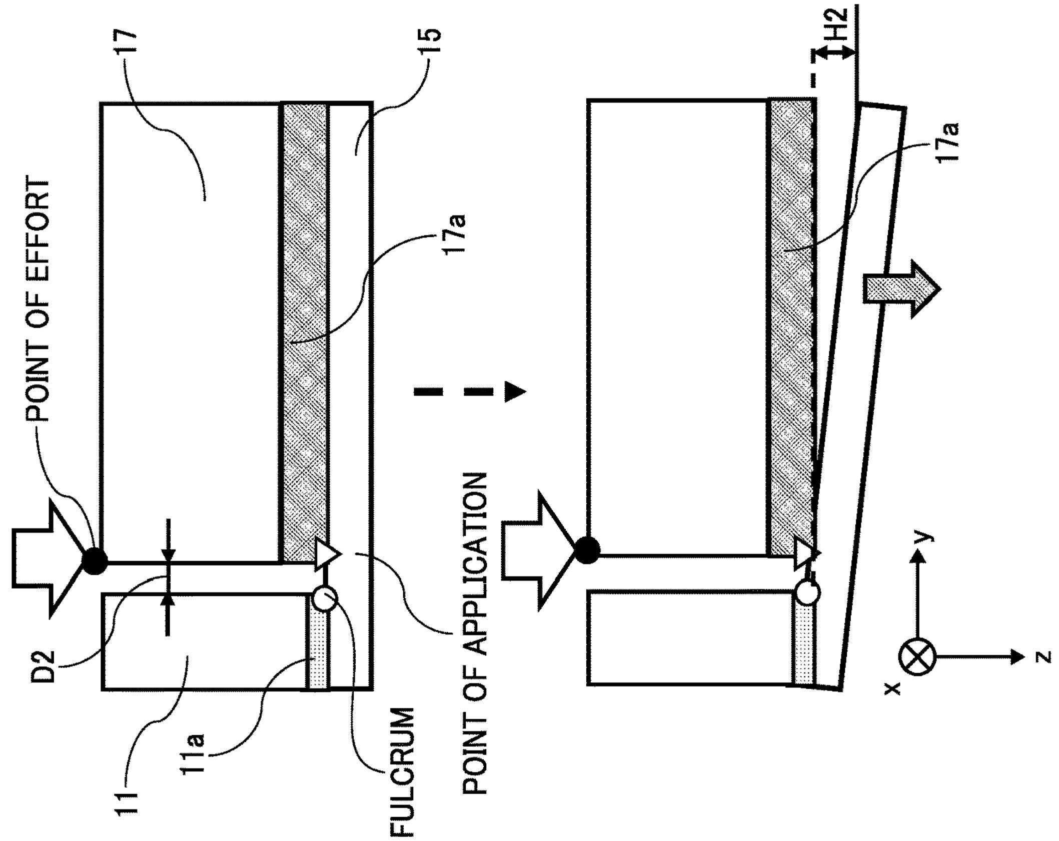
FIGS. 7A and 7B are diagrams each illustrating the deformation of a nozzle plate affected by a distance between a housing and a needle valve of a liquid discharge module.
Figure 7A:
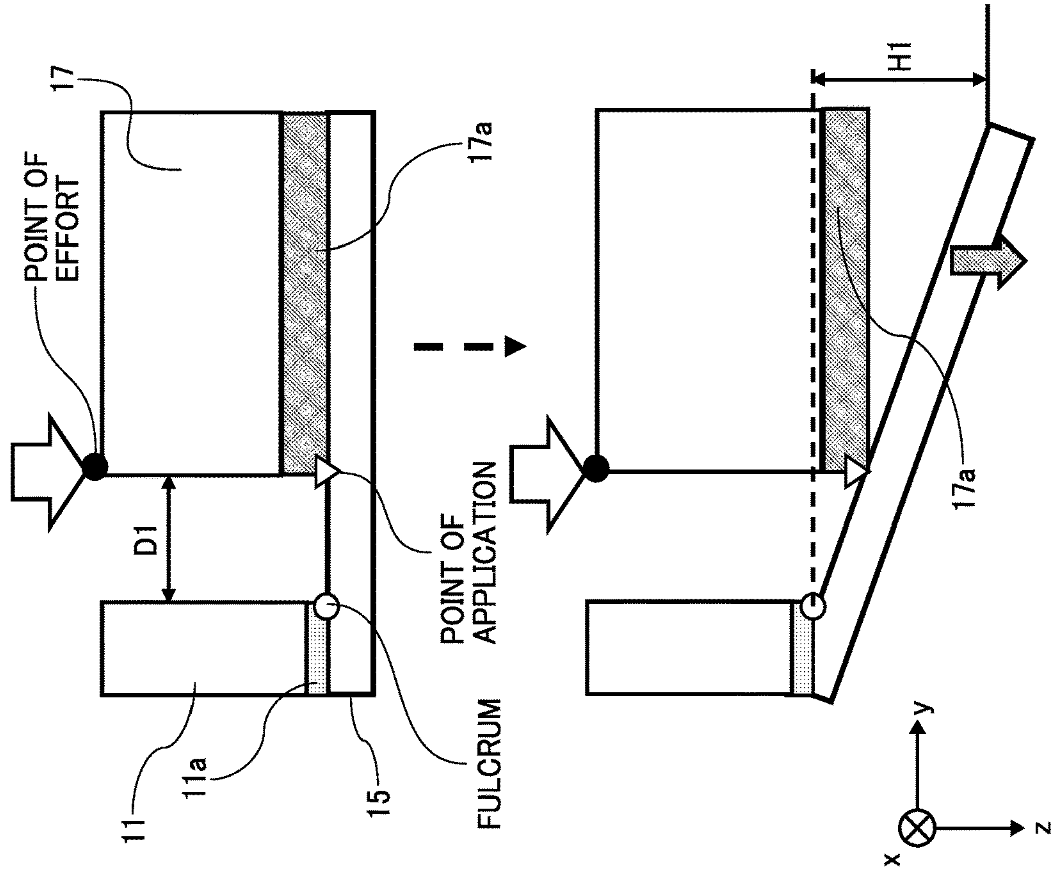

FIGS. 7A and 7B are diagrams each illustrating the deformation of the nozzle plate affected by the distance between the housing and the needle valve. FIG. 7A is an enlarged view of the seal member 17*a* at the leading end of the needle valve 17, the nozzle plate 15, and the housing 11. FIG. 7B is an enlarged view similar to FIG. 7A when an end of the side face of the needle valve 17 (the face of the needle valve 17 in the y direction in FIG. 7B) is closer to the housing 11 than that in FIG. 7A. Distances D1 and D2, respectively, in FIGS. 7A and 7B are each the distance between the housing 11 and the needle valve 17. The distance D2 between the housing 11 and the needle valve 17 in FIG. 7B is shorter than the distance D1 between the housing 11 and the needle valve 17 in FIG. 7A (i.e., D1>D2).

As in the upper illustration of FIG. 7A, the pressing force is applied from the needle valve 17 to the nozzle plate 15 as indicated by the blank arrow. The point of effort at which the pressing force is applied is indicated by the solid circle in FIG. 7A. The face of the housing 11 facing the nozzle plate 15 and the portion of the nozzle plate 15 facing the liquid chamber are joined to each other around the liquid chamber. The joined portion between the housing 11 and the nozzle plate 15 is referred to as a joint 11*a*. As in the lower illustration of FIG. 7A, a point of the joint 11*a* serves as a fulcrum indicated by the hollow circle in FIG. 7A. When the seal member 17*a* of the needle valve 17 contacts the nozzle plate 15, the nozzle plate 15 deforms toward the ink discharge side (in the direction indicated by the solid arrow) according to the "principle of leverage" about the fulcrum. The contact point between the seal member 17*a* and the nozzle plate 15 serves as a point of application indicated by the hollow triangle in FIG. 7A. The amount of deformation (amount of displacement) of the nozzle plate 15 in this case is defined as H1.

A case when the needle valve 17 is closer to the housing 11 than that in FIG. 7A is described below with reference to FIG. 7B. As in the upper illustration of FIG. 7B, the end of the side face of the needle valve 17 is closer to the housing 11 than that in FIG. 7A. As a result, the distance between the point of application and the fulcrum becomes shorter. As in the lower illustration of FIG. 7B, the nozzle plate 15 deforms toward the ink discharge side (in the direction indicated by the solid arrow) according to the "principle of leverage" described above. The amount of deformation (amount of displacement) of the nozzle plate 15 in this case is defined as H2. The amount of deformation H2 (amount of displacement) of the nozzle plate 15 in FIG. 7B is smaller than the amount of deformation H1 (amount of displacement) of the nozzle plate 15 in FIG. 7A since the point of application in FIG. 7B is closer to the joint 11*a* of the housing 11 as fulcrum than the point of application in FIG. 7A (i.e., H1>H2).

Thus, although a certain level of gap is preferably disposed between the housing 11 and the needle valve 17, the shorter distance between the housing 11 and the end of the side face of the needle valve 17 minimizes the deformation of the nozzle plate 15 and is effective in enhancing the ink sealing performance. In consideration of the above, liquid discharge modules according to embodiments of the present disclosure have configurations described below.

Figure 8A:
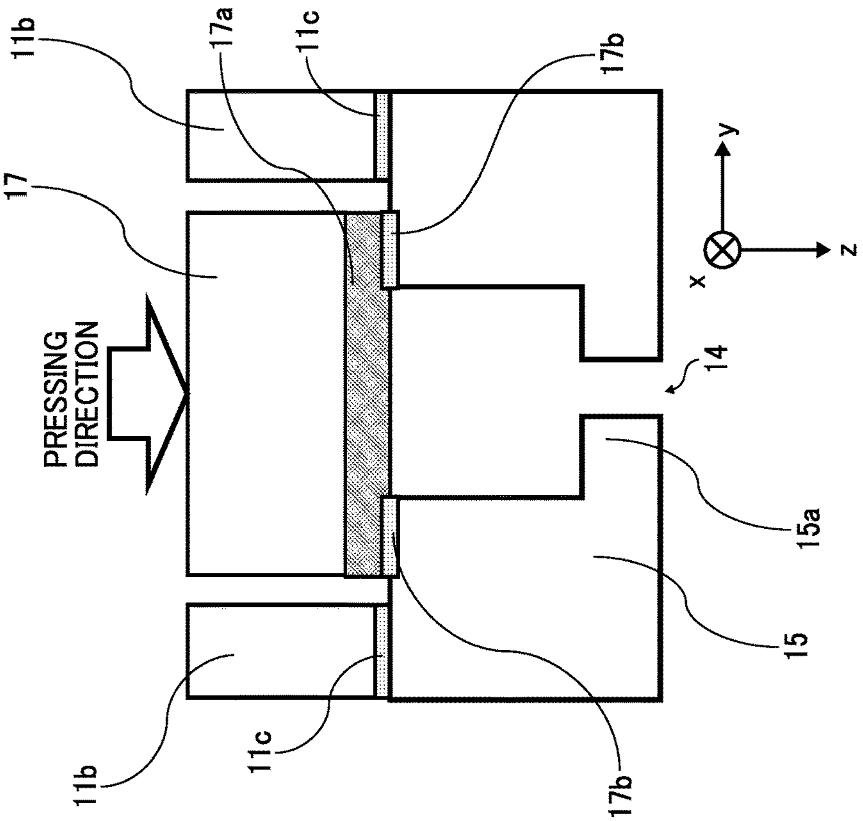
FIGS. 8A and 8B are schematic views of a liquid discharge module according to a second embodiment of the present disclosure.
Figure 8B:
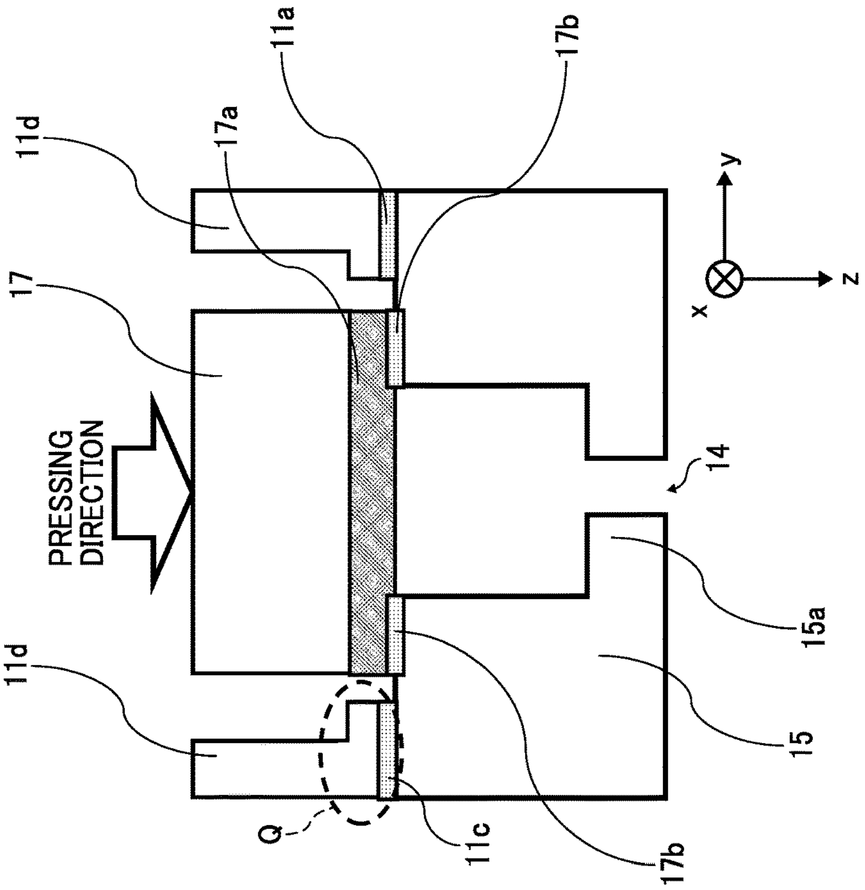

FIGS. 8A and 8B are schematic views of a liquid discharge module according to a second embodiment of the present disclosure. The configuration according to the present embodiment in FIGS. 8A and 8B is formed based on the mechanism described with reference to FIGS. 7A and 7B.

Referring to FIG. 8A, the needle valve 17 has the identical external size to the needle valve 17 in the first embodiment, but a housing 11*b* (i.e., the side wall) is larger in thickness than the housing 11 in the first embodiment. The housing 11*b* having the large thickness shortens the distance between the housing 11*b* and the needle valve 17 as compared with the corresponding distance in the first embodiment.

A joint 11*c* between the housing 11*b* and the nozzle plate 15 is larger than the joint 11*a* in the first embodiment. In the present embodiment, the configuration described above prevents the nozzle plate 15 from being deformed.

In the configuration in FIG. 8A, although the distance between the housing 11*b* and the needle valve 17 is set to 1 mm in consideration of assembly, the minimum distance between the housing 11*b* and the sealed portion 17*b* is about 0.5 mm. The thickness of the housing 11*b* is set to 0.5 mm. The distance and thickness are not limited to the above settings.

Another liquid discharge module according to the second embodiment is described below. Referring to FIG. 8B, a housing 11*d* (i.e., the side wall) has a portion that is joined to the nozzle plate 15 and is longer than the other portion of the housing 11*d*. The fulcrum that is a point of the joint 11*c* between the housing 11*d* and the nozzle plate 15 is close to the needle valve 17. In other words, the housing 11*d* has the side wall defining the liquid chamber, and the side wall has a projection projecting toward the inside of the liquid chamber at the end of the side wall adjacent to the nozzle plate 15. In FIG. 8B, the projection is a portion Q enclosed by the broken circle.

The thick housing 11*b* as illustrated in FIG. 8A may reduce an amount of stored ink in the liquid chamber as compared with the amount of stored ink in the liquid chamber in the first embodiment. However, the housing 11*d* as illustrated in FIG. 8B defines the liquid chamber that can store the amount of ink, for example, equivalent to or more than the amount of stored ink in the liquid chamber in the first embodiment, and prevents the nozzle plate 15 from being deformed.

In the configuration in FIG. 8B, although the distance between the housing 11*d* and the needle valve 17 is set to 1 mm in consideration of assembly, the minimum distance between the housing 11*d* and the sealed portion 17*b* is about 0.5 mm. The thickness of the projection of the housing 11*d* is set to 0.5 mm from the viewpoint of processing. The thickness of the other portion of the housing 11*d* is thinner than the projection (e.g., less than 0.5 mm). The distance and thickness are not limited to the above settings.

According to the respective configurations in FIGS. 8A and 8B, the nozzle 14 has a stepped structure, so that the nozzle plate 15 has a thick portion. The needle valve 17 contacts the thick portion of the nozzle plate 15. In other words, the sealed portion 17*b* is formed outside the inner circumference of the space having the largest inner diameter of the nozzle 14. Such a configuration can prevent the deformation of the nozzle plate 15 by the pressing force of the needle valve 17 and enhance the sealing performance.

In the present embodiment, the inner diameter of the nozzle 14 is larger on the liquid chamber side than on the discharge side. The length of the inner wall having the larger inner diameter on the liquid chamber side of the nozzle 14 is longer than the length of the inner wall on the discharge side of the nozzle 14 in the contact-separation direction. Both the inner wall on the discharge side of the nozzle and the inner wall on the liquid chamber side of the nozzle are parallel to the movement (contact-separation) direction of the needle valve.

Third Embodiment

Figure 9:
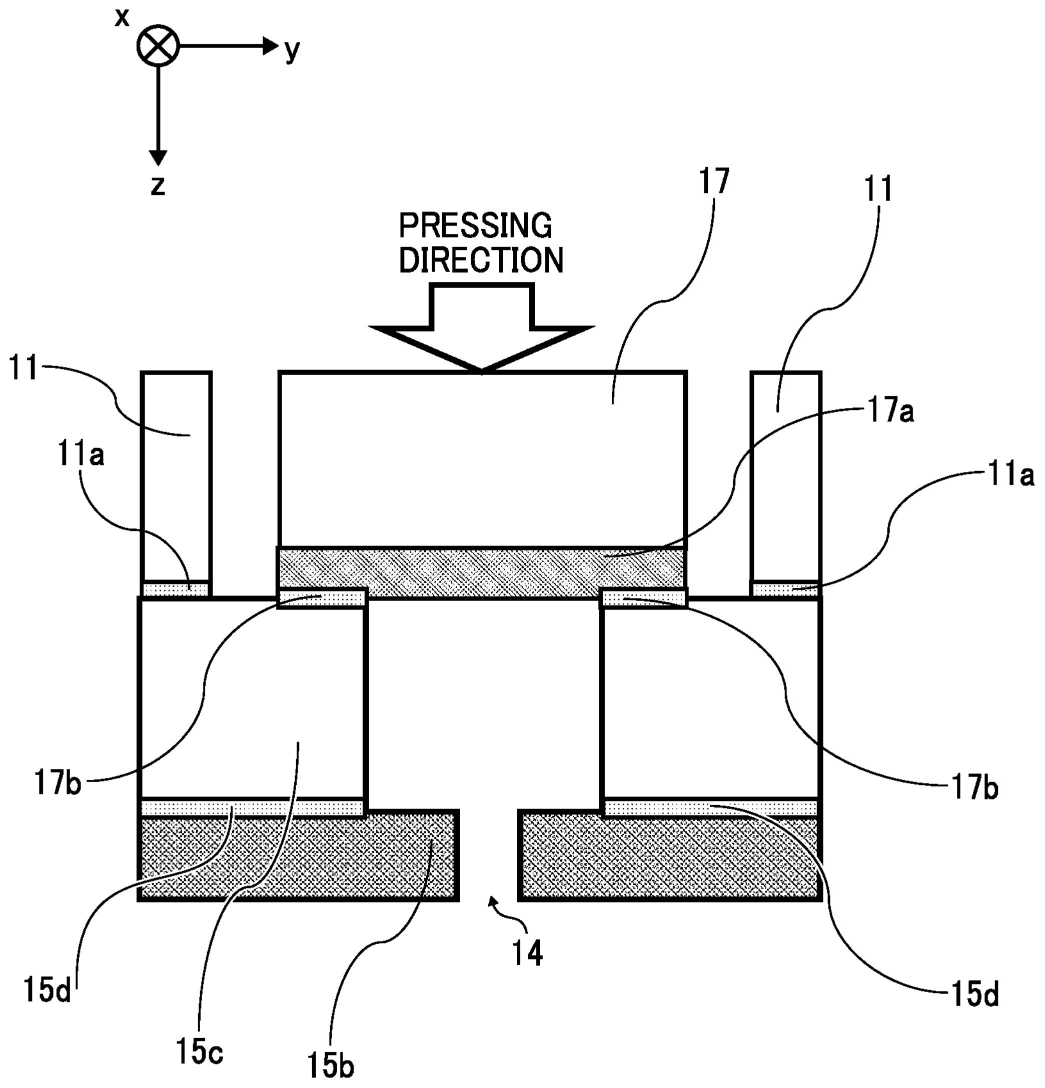
FIG. 9 is a schematic view of a liquid discharge module according to a third embodiment of the present disclosure.

A liquid discharge module according to a third embodiment of the present disclosure is described below. FIG. 9 is a schematic view of the liquid discharge module according to the third embodiment.

In the present embodiment, nozzle-plate formation members 15*b* and 15*c*, which are two plates, are arranged (laminated one on another) in the contact-separation (movement) direction of the needle valve 17 and bonded to each other to form the nozzle 14 having the step. In other words, multiple plates (nozzle-plate formation members) in combination form the nozzle plate instead of the nozzle plate 15 (single plate) as illustrated in FIG. 6A. The nozzle-plate formation members 15*b* and 15*c* (i.e., a first component and a second component) are bonded together with an adhesive at a joint 15*d*. In the present embodiment, the nozzle plate 15 has a large thickness at the contact portion (sealed portion 17*b*) between the seal member 17*a* at the leading end of the needle valve 17 and the nozzle plate 15. In other words, the sealed portion 17*b* is formed outside the inner circumference of the space having the largest inner diameter of the nozzle 14. In the present embodiment, the large thickness of the nozzle plate is the sum of the thicknesses of the nozzle-plate formation members 15*b* and 15*c*, which are two plates. Such a configuration according to the present embodiment prevents the deformation of the nozzle plate and enhances the ink sealing performance.

Materials for the nozzle-plate formation members are selected in terms of the durability and processability of the nozzle plate. Preferably, a material for the nozzle-plate formation member 15*b*, which forms the outlet of the nozzle 14, has higher processability than a material for the nozzle-plate formation member 15*c*. Specifically, SUS430 is suitable for the nozzle-plate formation member 15*b*, and SUS303 is suitable for the nozzle-plate formation member 15*c*.

When a nozzle plate is a single plate, the nozzle plate is processed by, for example, a drill to form a step in the nozzle. In this case, a certain type of material to be used for the single-piece nozzle plate may not be processed with the desired accuracy. In the present embodiment, materials different in the accuracy of processing can be each processed. In particular, the nozzle-plate formation member on the discharge side (nozzle-plate formation member 15*b* in the present embodiment) is preferably processed with high accuracy.

Thus, in the present embodiment, two components are bonded to each other to construct a nozzle plate having a step. As a result, the highly accurate discharging performance can be achieved, the deformation of the nozzle plate can be prevented, and the ink sealing performance can be enhanced. In the present embodiment, the nozzle plate is formed with two plate components, but a nozzle plate may be formed with three or more plate components.

In the present embodiment, the inner diameter of the nozzle 14 is larger on the liquid chamber side than on the discharge side. The length of the inner wall having the larger inner diameter on the liquid chamber side of the nozzle 14 is longer than the length of the inner wall on the discharge side of the nozzle 14 in the contact-separation direction. Both the inner wall on the discharge side of the nozzle and the inner wall on the liquid chamber side of the nozzle are parallel to the movement (contact-separation) direction of the needle valve.

Fourth Embodiment

Figure 10B:
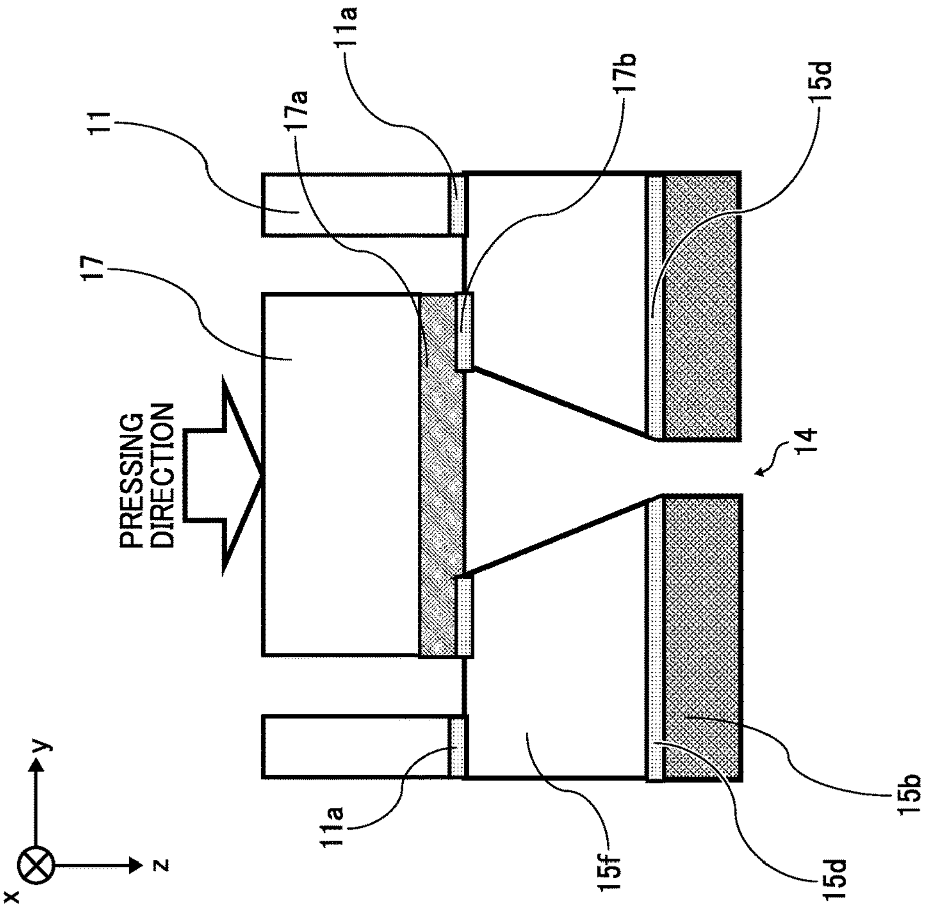
FIGS. 10A and 10B are schematic views of a liquid discharge module according to a fourth embodiment of the present disclosure.
Figure 10A:
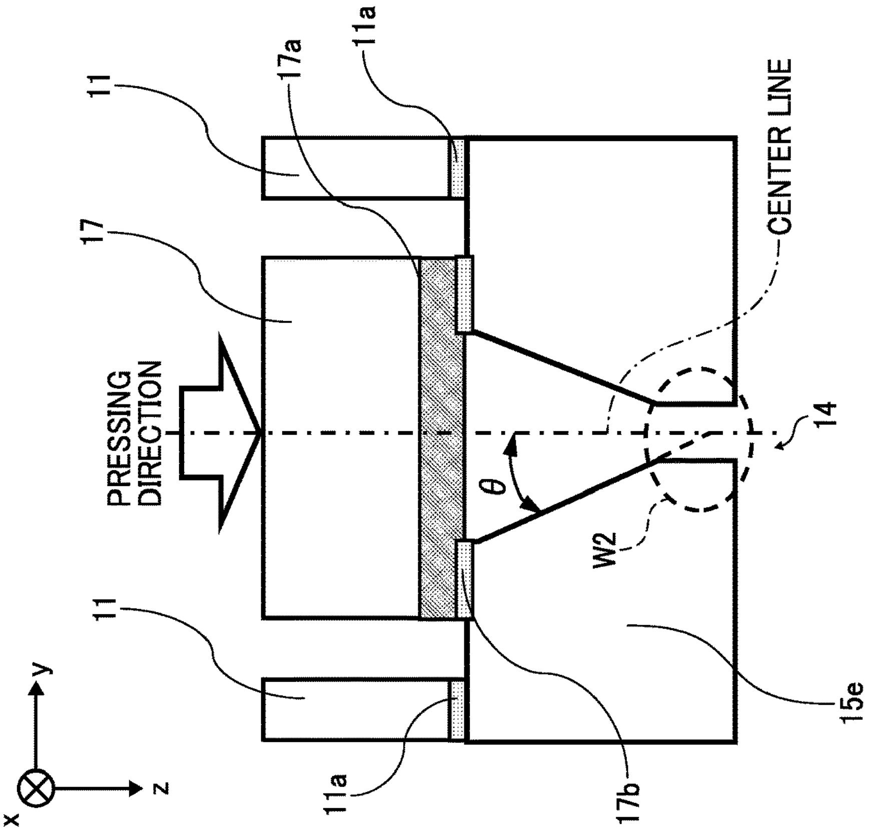

A liquid discharge module according to a fourth embodiment of the present disclosure is described below. FIGS. 10A and 10B are schematic views of the liquid discharge module according to the fourth embodiment.

In the present embodiment, a nozzle has an inner wall on the needle valve side (on the side on which the needle valve contacts the nozzle plate, i.e., the liquid chamber side) at a predetermined angle and another inner wall on the discharge side connected to the inner wall. The inner wall on the discharge side of the nozzle is parallel to the movement (contact-separation) direction of the needle valve.

The nozzle in FIG. 10A has a tapered step such that the nozzle has an inner diameter increasing in a direction toward the side on which the needle valve 17 contacts a nozzle plate 15*e*. In such a configuration, the sealed portion 17*b* between the seal member 17*a* at the leading end of the needle valve 17 and the nozzle plate 15*e* in contact with each other is formed at a portion of the nozzle plate 15*e* having the large thickness. In other words, the sealed portion 17*b* is formed outside the inner circumference of the space having the largest inner diameter of the nozzle 14. The inner diameter of the nozzle 14 is narrower on the discharge side than on the sealed portion 17*b* side (see a portion W2 in FIG. 10A). Thus, for example, the nozzle plate has higher rigidity than the nozzle plate according to the first embodiment. Thus, the deformation of the nozzle plate can be further prevented, and the ink sealing performance can be further enhanced. Unlike the configuration according to the first embodiment, the step of the nozzle is continuous at an obtuse angle and does not have right angle corners. Thus, ink is less likely to remain in the nozzle, the residual ink is less likely to adhere to the inner wall of the nozzle, and bubbles are less likely to remain in the ink.

From the viewpoint of processability, the slope (slant) of the inner wall of the nozzle 14 is preferably processed by a drill. When high-viscosity liquid is discharged, the slope (slant) is preferably steep to facilitate the flow of liquid. Thus, in consideration of the processability and facilitation of the flow of liquid, an angle θ between the slope (slant) and a central line that is a line passing through the center (central axis) of the hole of the nozzle 14 in FIG. 10A is approximately 45 degrees. When low-viscosity liquid is discharged, the angle θ may be approximately 70 degrees. The angle is not limited to the above settings.

In the present embodiment, a nozzle plate can be formed with two plate components. Such a formation is described below. Referring to FIG. 10B, nozzle-plate formation members 15*b* and 15*f* (i.e., the first component and the second component), which are two plates, are arranged (laminated one on another) in the contact-separation (movement) direction of the needle valve 17 and bonded to each other to form the nozzle 14 having the step. In such a configuration in FIG. 10B, the nozzle is tapered such that the nozzle has an inner diameter increasing in a direction toward the side on which the needle valve 17 contacts the nozzle-plate formation member 15*f*.

The nozzle-plate formation members 15*b* and 15*f* are bonded to each other with an adhesive at the joint 15*d*. In the present embodiment, the nozzle plate has a large thickness at the contact portion (sealed portion 17*b*) between the seal member 17*a* at the leading end of the needle valve 17 and the nozzle plate 15. In other words, the sealed portion 17*b* is formed outside the inner circumference of the space having the largest inner diameter of the nozzle 14. In the present embodiment, the large thickness of the nozzle plate is the sum of the thicknesses of the nozzle-plate formation members 15*b* and 15*f*, which are two plates. Such a configuration according to the present embodiment prevents the deformation of the nozzle plate and enhances the ink sealing performance as compared with the configuration according to the first embodiment.

The angle of the slope (slant) of the inner wall of the nozzle 14 is similar to the angle in the configuration in FIG. 10A.

Materials for the nozzle-plate formation members are selected in terms of the durability and processability of the nozzle plate. Preferably, a material for the nozzle-plate formation member 15*b*, which forms the outlet of the nozzle 14, has higher processability than a material for the nozzle-plate formation member 15*f*. Specifically, SUS430 is suitable for the nozzle-plate formation member 15*b*, and SUS303 is suitable for the nozzle-plate formation member 15*f*.

When a nozzle plate is a single plate, the nozzle plate is processed by, for example, a drill to form a step in the nozzle. In this case, a certain type of material to be used for the single-piece nozzle plate may not be processed with a desired accuracy. In the present embodiment, materials different in the accuracy of processing can be each processed. In particular, the nozzle-plate formation member on the discharge side (nozzle-plate formation member 15*b* in the present embodiment) is preferably processed with high accuracy.

Thus, in the present embodiment, two components are bonded to each other to construct a nozzle plate having a step. As a result, the highly accurate discharging performance can be achieved, the deformation of the nozzle plate can be prevented, and the ink sealing performance can be enhanced. In the present embodiment, the nozzle plate is formed with two plate components, but a nozzle plate may be formed with three or more plate components.

In the present embodiment, the inner diameter of the nozzle 14 is larger on the liquid chamber side than on the discharge side. The length of the inner wall having the larger inner diameter on the liquid chamber side of the nozzle 14 is longer than the length of the inner wall on the discharge side of the nozzle 14 in the contact-separation direction. The inner wall on the discharge side of the nozzle is parallel to the movement (contact-separation) direction of the needle valve. The inner wall on the liquid chamber side of the nozzle is connected to the inner wall on the discharge side of the nozzle at a predetermined angle. The inner diameter on the liquid chamber side increases toward the liquid chamber.

Fifth Embodiment

Figure 11A:
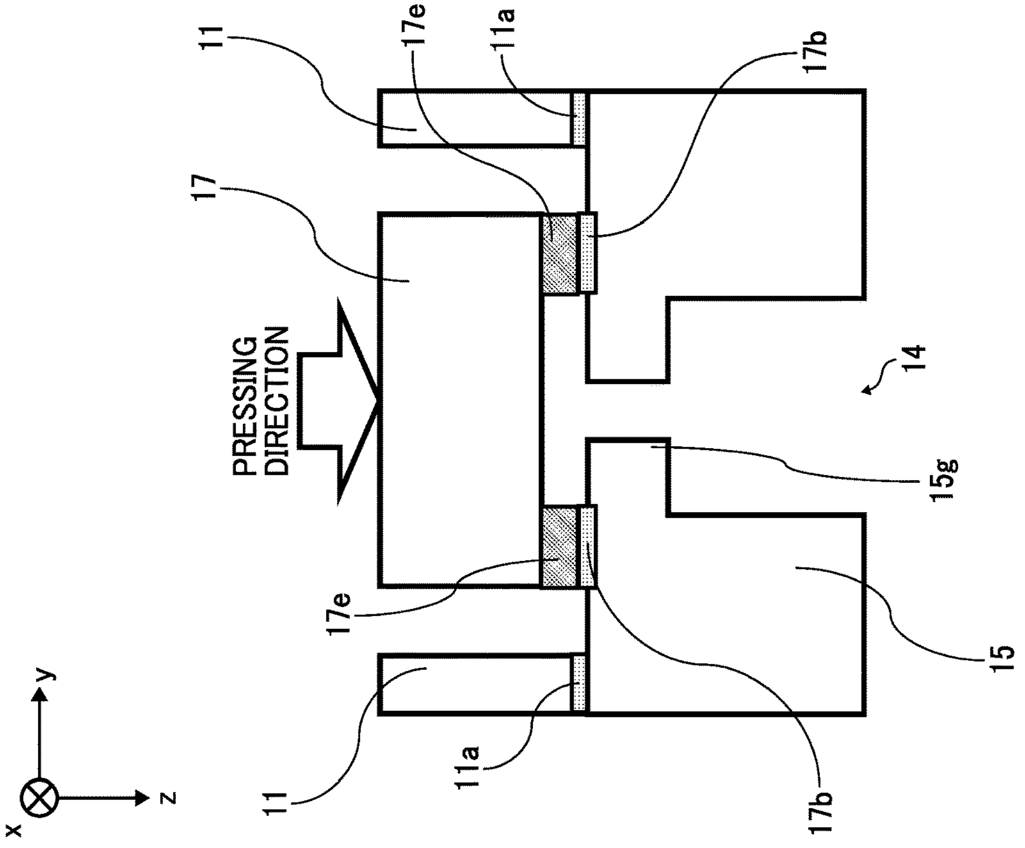
FIGS. 11A and 11B are schematic views of a liquid discharge module according to a fifth embodiment of the present disclosure.
Figure 11B:
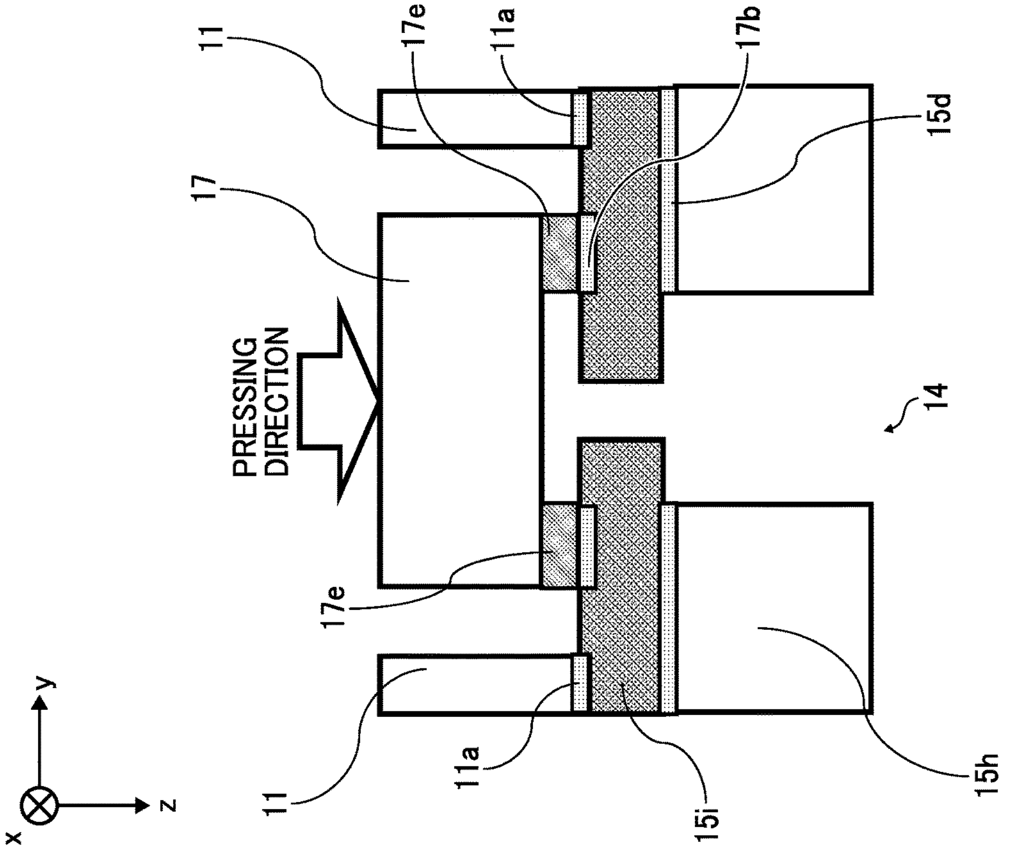

A liquid discharge module according to a fifth embodiment of the present disclosure is described below. FIGS. 11A and 11B are schematic views of the liquid discharge module according to the fifth embodiment.

In the present embodiment, a nozzle has a step such that the nozzle has an inner diameter larger on the discharge side than on the liquid chamber side, in contrast to the nozzle according to the first embodiment. In this configuration, the nozzle is wider on the ink discharge side (outlet side) than on the liquid chamber side, and the straight portion of the inner wall of the nozzle is shortened. As a result, the fluid resistance is reduced, and the discharge velocity of ink can be increased.

FIG. 11A illustrates a nozzle plate 15, which is one plate, having a step 15*g* such that a nozzle 14 has an inner diameter larger on the discharge side than on the liquid chamber side. The nozzle plate 15 has a large thickness at the contact portion (sealed portion 17*b*) between a seal member 17*e* at the leading end of the needle valve 17 and the nozzle plate 15 in the movement direction of the needle valve 17. In other words, the sealed portion 17*b* is formed outside the inner circumference of the space having the largest inner diameter of the nozzle 14 (i.e., the inner circumference of the space having the large inner diameter on the discharge side). In addition, the sealed portion 17*b* is formed a predetermined distance away from the nozzle hole of the nozzle 14 on the face (i.e., the first face) of the nozzle plate 15 on the liquid chamber side to avoid pressing the step 15*g* which is a thin portion. Such a configuration can prevent the deformation of the nozzle plate 15.

The seal member 17*e* attached to the leading end of the needle valve 17 is preferably processed to reduce the area of the sealed portion 17*b*, for example, as compared with the configuration according to the first embodiment, so as to reduce the deformation of the nozzle plate 15. Since the step 15*g* is thinner than the other portion of the nozzle plate 15, the step 15*g* is likely to be deformed by the pressing force of the needle valve 17. The above configuration can prevent the deformation of the nozzle plate 15. In the present embodiment, the seal member 17*e* is a ring-shaped rubber bonded to the leading end of the needle valve 17. Alternatively, for example, a sealing member having a columnar shape processed (counterbored) to form a recess (cylindrical flat-bottomed hole) at the center can be used as in the configuration according to the first embodiment to reduce the deformation of the nozzle plate.

In the present embodiment, nozzle-plate formation members, which are two plates, may be bonded to each other to form the nozzle having the step. Such a configuration is described below with reference to FIG. 11B. Referring to FIG. 11B, nozzle-plate formation members 15*h* and 15*i* (i.e., the first component and the second component), which are two plates, are bonded to each other to form the nozzle having the step. The nozzle-plate formation members 15*h* and 15*i* are bonded to each other with an adhesive at the joint 15*d*. In the present embodiment, the nozzle plate 15 has a large thickness at the contact portion (sealed portion 17*b*) between the seal member 17*e* at the leading end of the needle valve 17 and the nozzle plate 15. In other words, the sealed portion 17*b* is formed outside the inner circumference of the space having the largest inner diameter of the nozzle 14 (i.e., the inner circumference of the space having the large inner diameter on the discharge side). In the present embodiment, the large thickness of the nozzle plate is the sum of the thicknesses of the nozzle-plate formation members 15*h* and 15*i*, which are two plates. Such a configuration according to the present embodiment prevents the deformation of the nozzle plate and enhances the ink sealing performance.

When a nozzle plate is a single plate, the nozzle plate is processed by, for example, a drill to form a step in the nozzle. In this case, a certain type of material to be used for the single-piece nozzle plate may not be processed with a desired accuracy. In the present embodiment, materials different in the accuracy of processing can be each processed. In particular, the nozzle-plate formation member on the discharge side (nozzle-plate formation member 15*h* in the present embodiment) is preferably processed with high accuracy. Thus, in the present embodiment, two components are bonded to each other to construct a nozzle plate having a step. As a result, the highly accurate discharging performance can be achieved, the deformation of the nozzle plate can be prevented, and the ink sealing performance can be enhanced. In the present embodiment, the nozzle plate is formed with two plate components, but a nozzle plate may be formed with three or more plate components.

In the present embodiment, the inner diameter of the nozzle 14 is smaller on the liquid chamber side than on the discharge side. The length of the inner wall having the larger inner diameter on the discharge side of the nozzle 14 is longer than the length of the inner wall on the liquid chamber side of the nozzle 14 in the contact-separation direction.

Sixth Embodiment

Figure 12B:
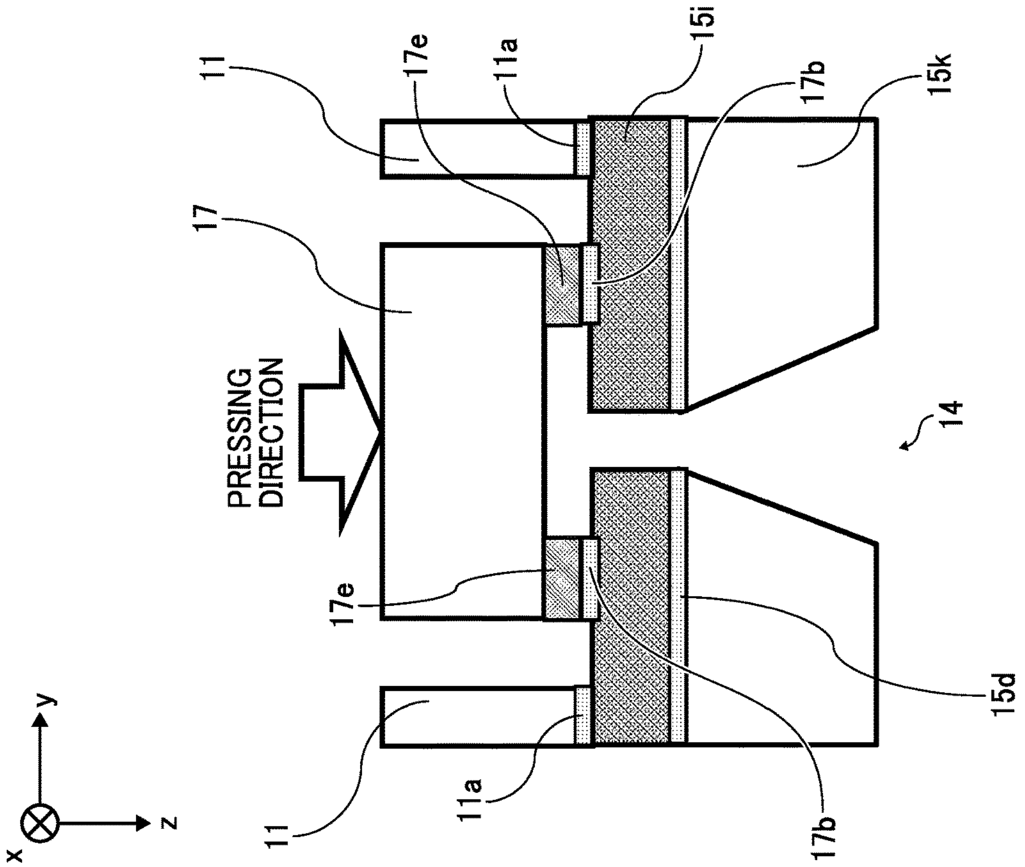
FIGS. 12A and 12B are schematic views of a liquid discharge module according to a sixth embodiment of the present disclosure.
Figure 12A:
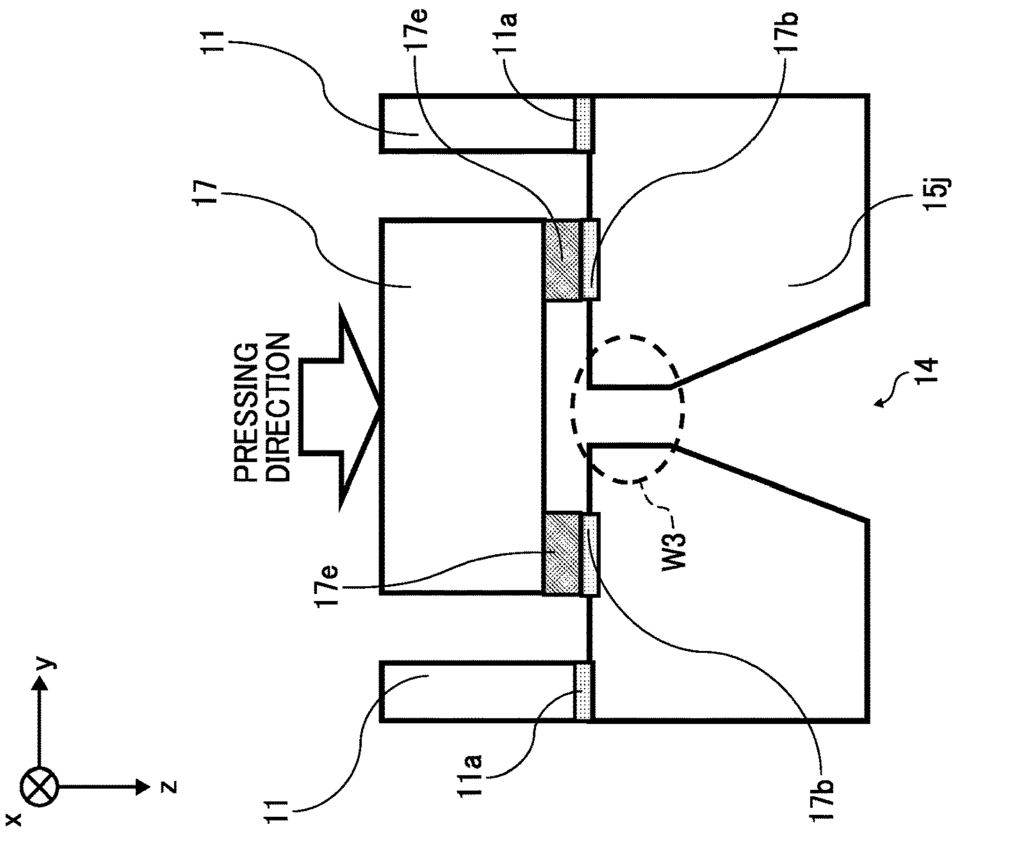

A liquid discharge module according to a sixth embodiment of the present disclosure is described below. FIGS. 12A and 12B are schematic views of the liquid discharge module according to the sixth embodiment. The inner wall on the liquid chamber side of the nozzle is parallel to the movement (contact-separation) direction of the needle valve.

In the present embodiment, a nozzle has a step such that the nozzle has an inner diameter larger on the discharge side than on the liquid chamber side. The nozzle has an inner wall on the discharge side of ink at a predetermined angle and another inner wall on the needle valve side connected to the inner wall. The inner wall on the liquid chamber side (on the side on which the needle valve contacts the nozzle plate) of the nozzle is parallel to the movement (contact-separation) direction of the needle valve. In this configuration, the nozzle is wider on the ink discharge side (outlet side) than on the liquid chamber, and the straight portion of the inner wall of the nozzle is shortened. As a result, the fluid resistance is reduced, and the discharge velocity of ink can be increased.

The nozzle in FIG. 12A has a tapered step such that the nozzle has an inner diameter decreasing in a direction toward the side on which the needle valve 17 contacts a nozzle plate 15*j*.

In such a configuration, the sealed portion 17*b* between the seal member 17*a* at the leading end of the needle valve 17 and the nozzle plate 15*j* in contact with each other is formed at a portion of the nozzle plate 15*j* having the large thickness. In other words, the sealed portion 17*b* is formed outside the inner circumference of the space having the largest inner diameter of the nozzle 14. In addition, the sealed portion 17*b* is formed a predetermined distance away from the nozzle hole of the nozzle 14 on the face of the nozzle plate 15 on the liquid chamber side.

In the present embodiment, the inner diameter of the nozzle 14 is narrower on the needle valve 17 side (liquid chamber side) than on the discharge side of ink (see a portion W3 in FIG. 12A). Thus, for example, the nozzle plate has higher rigidity than the nozzle plate according to the fifth embodiment. Accordingly, the deformation of the nozzle plate can be further prevented, and the ink sealing performance can be further enhanced. Unlike the configuration according to the fifth embodiment, the step of the nozzle is continuous at an obtuse angle and does not have right angle corners. Thus, ink is less likely to remain in the nozzle, the residual ink is less likely to adhere to the inner wall of the nozzle, and bubbles are less likely to remain in the ink.

Similarly to the configuration according to the fifth embodiment, the seal member 17*e* attached to the leading end of the needle valve 17 is preferably processed to reduce the area of the sealed portion 17*b*, for example, as compared with the configuration according to the first embodiment, so as to reduce the deformation of the nozzle plate 15. Since the portion of the nozzle plate 15*j* having the small diameter on the needle valve 17 side is thinner than on the other portion of the nozzle plate 15*j*, the portion having the small diameter is likely to be deformed by the pressing force of the needle valve 17.

The above configuration can prevent the deformation of the nozzle plate 15. In the present embodiment, the seal member 17*e* is a ring-shaped rubber bonded to the leading end of the needle valve 17. Alternatively, for example, a sealing member having a columnar shape processed (counterbored) to form a recess (cylindrical flat-bottomed hole) at the center can be used as in the configuration according to the first embodiment to reduce the deformation of the nozzle plate.

In the present embodiment, a nozzle plate can be formed with two plate components. Such a formation is described below. Referring to FIG. 12B, nozzle-plate formation members 15*k* and 15*i* (i.e., the first component and the second component), which are two plates, are arranged (laminated one on another) in the contact-separation (movement) direction of the needle valve 17 and bonded to each other to form the nozzle 14 having the step. In FIG. 12B, the nozzle is tapered such that the nozzle has an inner diameter increasing in a direction toward the discharge side of ink of the nozzle-plate formation member 15*k*.

The nozzle-plate formation members 15*k* and 15*i* are bonded to each other with an adhesive at the joint 15*d*. In the present embodiment, the nozzle plate has a large thickness at the contact portion (sealed portion 17*b*) between the seal member 17*a* at the leading end of the needle valve 17 and the nozzle plate 15. In other words, the sealed portion 17*b* is formed outside the inner circumference of the space having the largest inner diameter of the nozzle 14. In the present embodiment, the large thickness of the nozzle plate is the sum of the thicknesses of the nozzle-plate formation members 15*k* and 15*i*, which are two plates. Such a configuration according to the present embodiment prevents the deformation of the nozzle plate and enhances the ink sealing performance as compared with the configuration according to the first embodiment.

Similarly to the above embodiment illustrated in FIG. 12A, the seal member 17*e* is preferably processed to reduce the area of the sealed portion 17*b*, for example, as compared with the configuration according to the first embodiment, so as to reduce the deformation of the nozzle plate 15.

When a nozzle plate is a single plate, the nozzle plate is processed by, for example, a drill to form a step in the nozzle. In this case, a certain type of material to be used for the single-piece nozzle plate may not be processed with a desired accuracy. In the present embodiment, materials different in the accuracy of processing can be each processed. In particular, the nozzle-plate formation member on the discharge side (nozzle-plate formation member 15*k* in the present embodiment) is preferably processed with high accuracy. Thus, in the present embodiment, two components are bonded to each other to construct a nozzle plate having a step. As a result, the highly accurate discharging performance can be achieved, the deformation of the nozzle plate can be prevented, and the ink sealing performance can be enhanced. In the present embodiment, the nozzle plate is formed with two plate components, but a nozzle plate may be formed with three or more plate components.

In the present embodiment, the inner diameter of the nozzle 14 is smaller on the liquid chamber side than on the discharge side. The length of the inner wall having the larger inner diameter on the discharge side of the nozzle 14 is longer than the length of the inner wall on the liquid chamber side of the nozzle 14 in the contact-separation direction.

According to the embodiments described above, the nozzle has one step. However, the number of steps is not limited to one, and may be 2 or more to obtain the desired discharging performance.

Liquid Discharge Apparatus

A liquid discharge apparatus including the above-described liquid discharge head or liquid discharge unit is described below. The configuration according to any of the above-described embodiments can be applied to the following configuration. In the drawings for the following embodiments, X, Y, and Z directions are different in definition from the above. The configuration of the liquid discharge head 10 described above is applied to a head 100 described below. The head 100 is described below. For convenience of description, the other terms are denoted with changed reference signs.

Applied Case to Vehicle-Body Coating System

Figure 13:
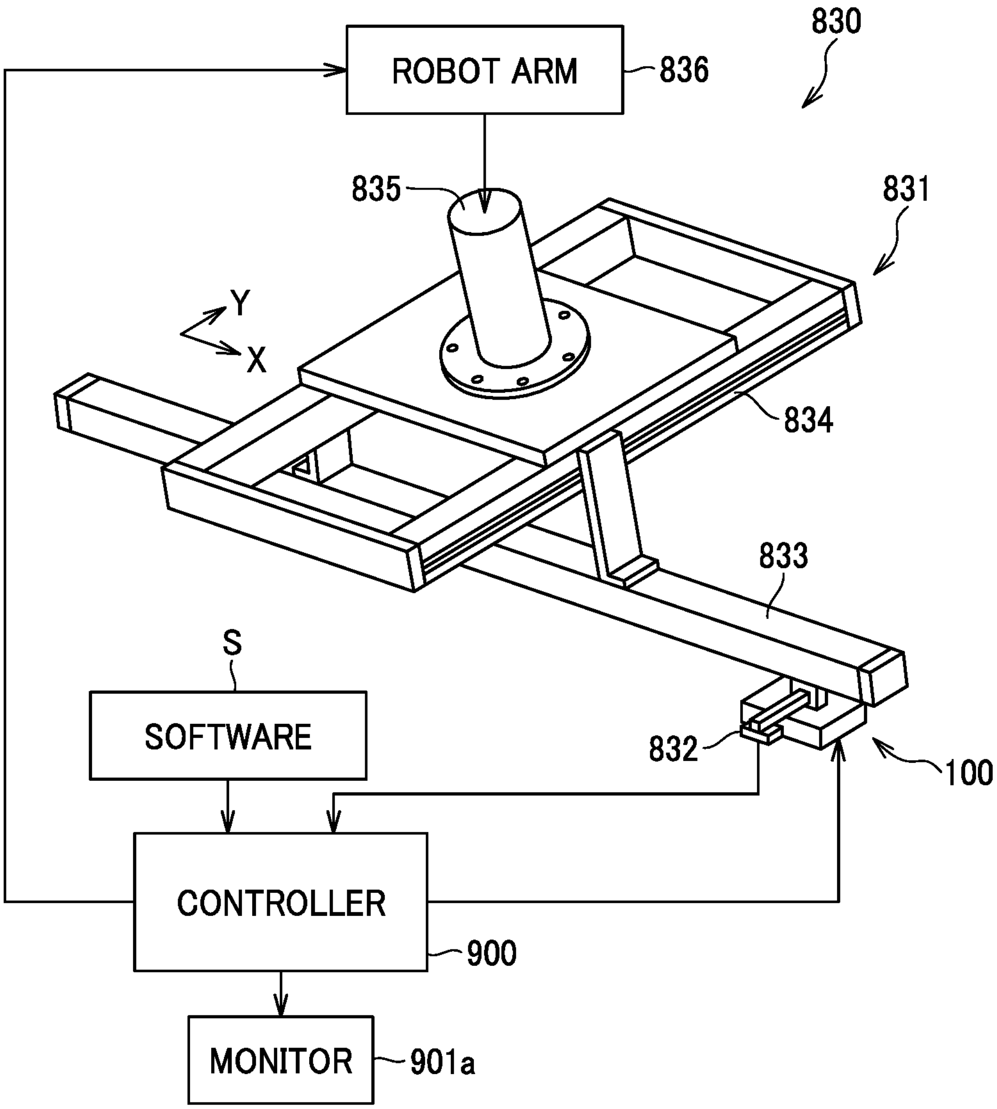
FIG. 13 is a diagram of a vehicle-body coating system according to an embodiment of the present disclosure.
Figure 14A:
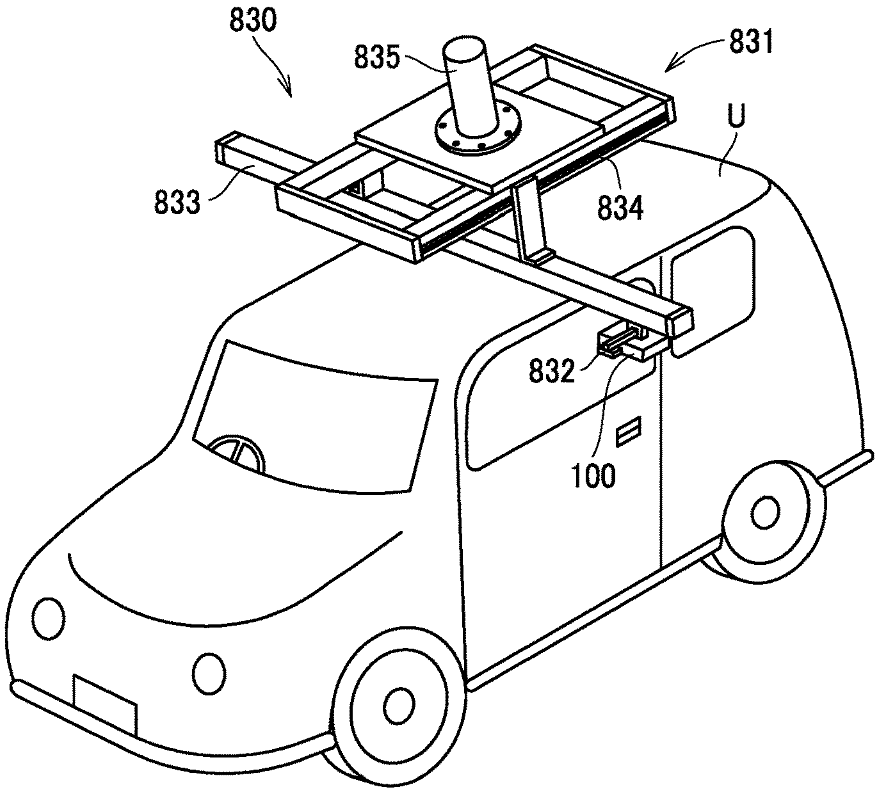
FIGS. 14A and 14B are diagrams illustrating the operation of the vehicle-body coating system of FIG. 13.
Figure 14B:
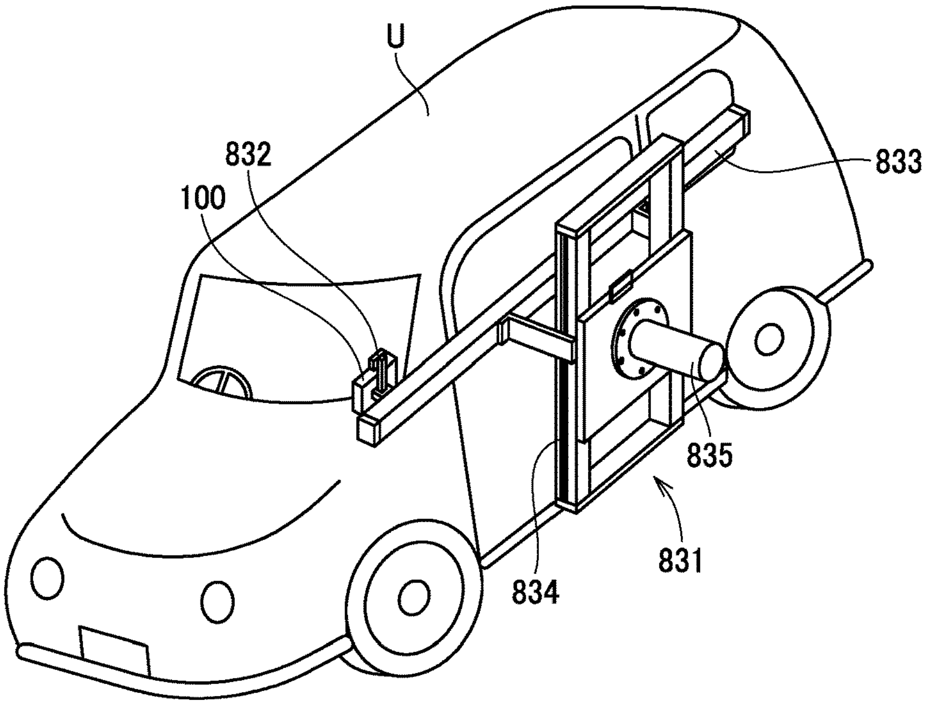

An applied case to a vehicle-body coating system as a liquid discharge apparatus according to the present embodiment is described below with reference to FIG. 13 and FIGS. 14A and 14B. FIG. 13 is a diagram of a vehicle-body coating system according to the present embodiment. FIGS. 14A and 14B are diagrams illustrating the operation of the vehicle-body coating system of FIG. 13. FIG. 14A illustrates a first arrangement of the vehicle-body coating system relative to a coating target. FIG. 14B illustrates a second arrangement of the vehicle-body coating system relative to the coating target.

A vehicle-body coating system 830 includes at least one head 100, a camera 832 disposed near the head 100, an X-Y table 831 that moves the head 100 and the camera 832 in the X direction and in the Y direction, image editing software S for editing an image captured by the camera 832, a monitor 901*a* that displays, for example, an image to be edited, and a controller 900.

Based on a predetermined control program, the controller 900 operates the X-Y table 831 and additionally causes the head 100 to discharge liquid (e.g., paint).

The vehicle-body coating system 830 can coat a coating target U with the paint discharged from the head 100.

The head 100 discharges, through a nozzle hole, paint to the coating target face of the coating target U.

Paint is discharged from the nozzle hole in a direction substantially orthogonal to the X-Y plane.

The distance between the nozzle hole and the coating target face of the coating target U is, for example, approximately 20 cm.

The X-Y table 831 includes an X-axis member 833 provided with a linear movement mechanism and a Y-axis member 834 that has two arms holding the X-axis member 833 and moves the X-axis member 833 in the Y direction. The Y-axis member 834 is provided with a shaft 835. Because the shaft 835 is held by a robot arm 836, the head 100 and the camera 832 can be freely disposed relative to the coating target U.

For example, in a case where the coating target U is a motor vehicle, the X-Y table 831 can be disposed above the coating target U as illustrated in FIG. 14A or can be disposed laterally to the coating target U as illustrated in FIG. 14B. The controller 900 controls, based on a predetermined program, the operation of the robot arm 836.

While moving together with the head 100 in the X-Y directions, the camera 832 captures, at regular minute intervals, a predetermined range of the coating target face of the coating target U. The camera 832 is, for example, a digital camera. In specifications of the camera 832, a lens or a resolution is appropriately selected such that a plurality of finely divided images resulting from division of the predetermined range of the coating target face can be captured. In accordance with a program installed in the controller 900 in advance, the camera 832 captures continuously and automatically a plurality of finely divided images of the coating target face.

As described above, since the vehicle-body coating system 830 includes the head 100, even for a long distance between the coating target U and the nozzle hole, paint can be applied to a desired position on the coating target U with high accuracy. The head 100 can discharge paint reliably. Thus, the vehicle-body coating system 830 can coat the coating target U with paint with high accuracy.

Applied Case to Printer

Figure 15:
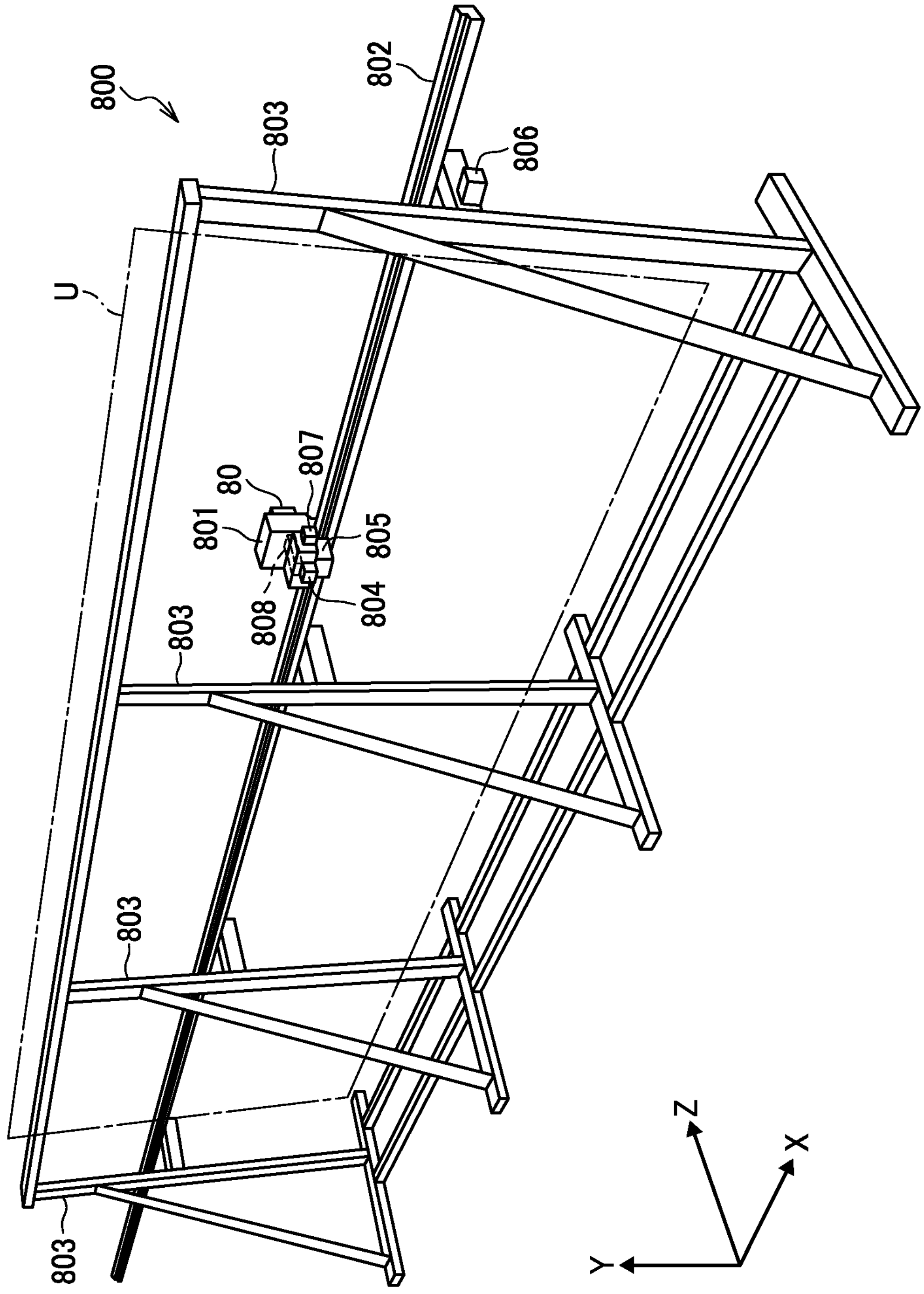
FIG. 15 is an overall perspective view of a printer according to an embodiment of the present disclosure.
Figure 16:
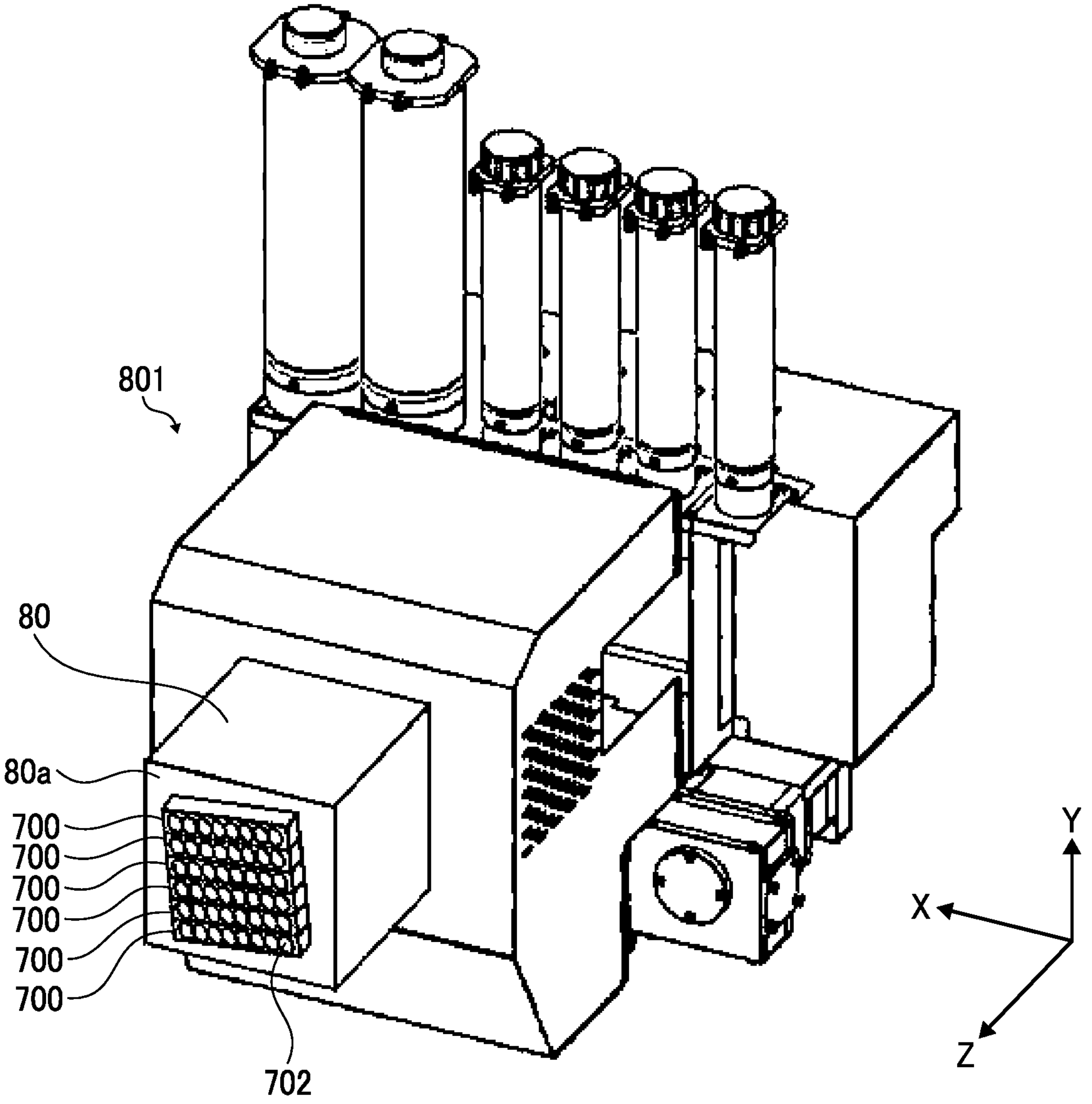
FIG. 16 is a perspective view of a carriage of a printer according to an embodiment of the present disclosure.

An applied case to a printer as a liquid discharge apparatus is described below with reference to FIGS. 15 and 16. FIG. 15 is a perspective view of a carriage for a printer according to the present embodiment. FIG. 16 is a perspective view of the entirety of an exemplary printer equipped with the carriage of FIG. 15. FIG. 16 illustrates a carriage 801 mounted on a printer 800 illustrated in FIG. 15 as viewed from the side of location of a coating target U.

The carriage 801 includes a head holding body 80. The carriage 801 can move in the Z direction (positively or negatively) along a Z-axis rail 804 due to power from a first Z-direction driver 807 of the printer 800 described later.

The head holding body 80 can move in the Z direction (positively or negatively) relative to the carriage 801 due to power from a second Z-direction driver 808 of the printer 800 described later. The head holding body 80 includes a head securing plate 80*a* for attachment of a head module 700. The carriage 801 serves as a head holder holding a liquid discharge head. A liquid discharge head including a plurality of nozzle holes is referred to as a head module for convenience in the present embodiment.

In this applied case, six liquid discharge heads having a plurality of nozzles (i.e., six head modules 700) are attached to the head securing plate 80*a* and stacked one on another.

The head modules 700 each include a plurality of nozzle holes 702. The number and type of colors of the paint used in the head modules 700 are not limited to any particular number and type, and the paint may be a different color for each head module 700 or may be the same color for all head modules 700. For example, when the printer 800 is an apparatus using a single color, the paint used in the head modules 700 may be the same color. The number of head modules is not limited to six. The number of head modules may be more than six or less than six. A zigzag array may be adopted to implement, for example, the number of nozzles for six head modules with five head modules or less.

The head modules 700 are secured to the head securing plate 80*a* such that a nozzle row, which is formed by the eight nozzle holes 702, of each head module 700 intersects the horizontal plane (i.e., the X-Z plane) and the multiple nozzle holes 702 are obliquely arrayed with respect to the X-axis as illustrated in FIG. 20. Thus, the head module 700 discharges droplets of the paint from the nozzle holes 702 in a direction (positive Z direction in the present embodiment) intersecting the direction of gravity.

The printer 800 illustrated in FIG. 15 is installed facing the coating target U. The printer 800 includes an X-axis rail 802, a Y-axis rail 803 intersecting the X-axis rail 802, and the Z-axis rail 804 intersecting the X-axis rail 802 and the Y-axis rail 803.

The Y-axis rail 803 holds the X-axis rail 802 such that the X-axis rail 802 can move in the Y direction (positively or negatively). The X-axis rail 802 holds the Z-axis rail 804 such that the Z-axis rail 804 can move in the X direction (positively or negatively). The Z-axis rail 804 holds the carriage 801 such that the carriage 801 can move in the Z direction (positively or negatively).

The printer 800 includes the first Z-direction driver 807 and an X-direction driver 805. The first Z-direction driver 807 moves the carriage 801 in the Z direction along the Z-axis rail 804. The X-direction driver 805 moves the Z-axis rail 804 in the X direction along the X-axis rail 802. The printer 800 includes a Y-direction driver 806 that moves the X-axis rail 802 in the Y direction along the Y-axis rail 803. The printer 800 includes the second Z-direction driver 808 that moves the head holding body 80 relative to the carriage 801 in the Z direction.

The printer 800 discharges paint from the head modules 700 mounted on the head holding body 80 while the carriage 801 moves in the X direction, the Y direction, and the Z direction to print on the coating target U. The movement of the carriage 801 and the head holding body 80 in the Z direction is not necessarily parallel to the Z direction, and may be an oblique movement including at least a Z direction component.

Although the coating target U is flat in FIG. 15, the coating target U may have a surface shape which is nearly vertical, a curved surface with a large radius of curvature, and a surface having a slight unevenness, such as a body of a car, a truck, or an aircraft.

Electrode Manufacturing Apparatus

Figure 17:
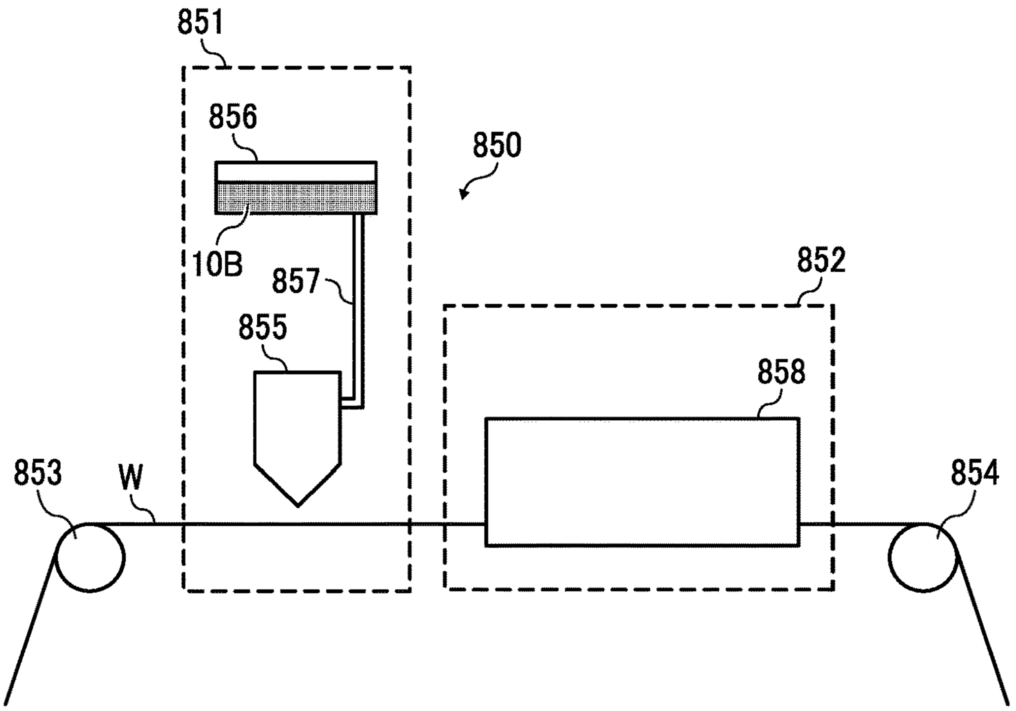
FIG. 17 is a schematic diagram of an electrode manufacturing apparatus for performing a method of manufacturing an electrode according to an embodiment of the present disclosure.

Embodiments according to the present disclosure include apparatuses for manufacturing electrodes and electrochemical devices. An electrode manufacturing apparatus according to an embodiment of the present disclosure is described below. FIG. 17 is a schematic view of an electrode manufacturing apparatus according to the present embodiment. An electrode manufacturing apparatus 850 uses the above-described liquid discharge apparatus to discharge a liquid composition in order to manufacture an electrode having a layer containing an electrode material.

Device to Form Layer Containing Electrode Material and Process of Forming Layer Containing Electrode Material A discharger in the present embodiment is the above-described liquid discharge apparatus. The discharger discharges and applies a liquid composition onto a target to form a liquid composition layer. The target is not limited to any particular object and can be suitably selected to suit to any application. The target is any object on which a layer containing an electrode material can be formed, such as an electrode substrate (current collector), an active material layer, and a layer containing a solid electrode material. The target may be referred to as a discharge target in the following description. If the discharger can form the layer containing the electrode material on the discharge target in a discharge process, the discharger may directly discharge the liquid composition or may indirectly discharge the liquid composition to form the layer containing the electrode material.

Other Devices and Other Processes

Other devices in the electrode manufacturing apparatus, which form an electrode composite layer, are not limited to any particular device and can be suitably selected to suit to any application as long as the effects of the present embodiment are not impaired. Examples of the device include a heater. Other processes performed by the electrode manufacturing apparatus, which forms an electrode composite layer, are not limited to any particular process and can be suitably selected to suit to any application as long as the effects of the present embodiment are not impaired. Examples of the process include a heating process.

Heater and Heating Process

The heater heats the liquid composition discharged by the discharger. The heating process is a process for heating the liquid composition discharged in the discharge process. The liquid composition layer can be dried by the heating.

Configuration in which Layer Containing Electrode Material is Formed by Directly Discharging Liquid Composition An electrode manufacturing apparatus according to an embodiment of the present disclosure, which forms an electrode composite layer containing an active material on an electrode substrate (current collector), is described below. An electrode manufacturing apparatus 850 includes a discharge process unit 851 and a heating process unit 852. The discharge process unit 851 performs the discharge process in which the liquid composition is applied to a print base material W having the discharge target to form the liquid composition layer. The heating process unit 852 performs a heating process in which the liquid composition layer is heated to obtain the electrode composite layer. The electrode manufacturing apparatus 850 includes conveyors 853 and 854 that convey the print base material W. The conveyors 853 and 854 convey the print base material W to the discharge process unit 851 and the heating process unit 852 in this order at a preset speed. A method of producing the print base material W having the discharge target such as the active material layer is not limited to any particular method, and a known method can be appropriately selected. The discharge process unit 851 includes a printer 855 according to the above-described embodiments, a storage container 856, and a supply tube 857. The printer 855 performs an application process of applying a liquid composition 10B onto the print base material W. The storage container 856 stores the liquid composition 10B. The supply tube 857 supplies the liquid composition 10B stored in the storage container 856 to the printer 855.

The storage container 856 stores the liquid composition 10B, and the discharge process unit 851 discharges the liquid composition 10B from the printer 855 to apply the liquid composition 10B onto the print base material W to form the liquid composition layer in a thin film shape. The storage container 856 may be integrated with the electrode manufacturing apparatus that forms the electrode composite layer or may be detachable from the electrode manufacturing apparatus. The storage container 856 includes a container for adding the liquid composition W to the storage container integrated with the electrode manufacturing apparatus or the storage container detachable from the electrode manufacturing apparatus.

The storage container 856 that stably stores the liquid composition W and supply tube 857 that stably supplies the liquid composition W can be used.

As illustrated in FIG. 17, the heating process unit 852 includes a heater 858 to perform a solvent removing process in which the solvent remaining in the liquid composition layer is heated and dried by the heater 858 to be removed. Thus, an electrode composite layer can be formed. The heating process unit 852 may perform the solvent removing process under reduced pressure.

The heater 858 is not limited to any particular device and can be suitably selected to suit to any application. Examples of the heater 703 include a substrate heating device, an infrared (IR) heater, and a hot-air heater, and the combination thereof. The heating temperature and time can be appropriately selected according to the boiling point of the solvent contained in the liquid composition 10B and the thickness of the formed film.

Figure 18:
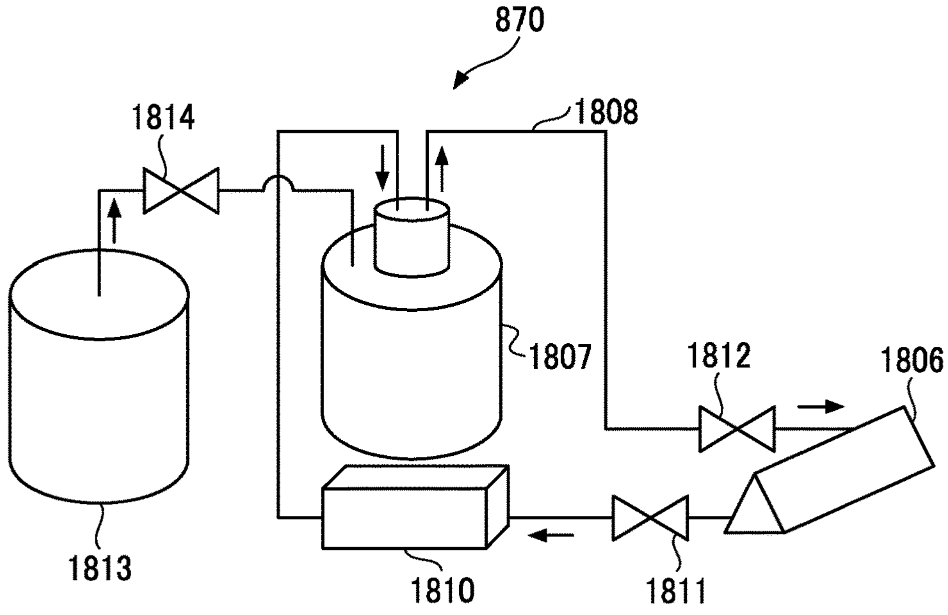
FIG. 18 is a schematic diagram of another electrode manufacturing apparatus for performing a method of manufacturing an electrode composite layer according to an embodiment of the present disclosure.

FIG. 18 is a schematic view of another electrode manufacturing apparatus (liquid discharge apparatus) according to an embodiment of the present disclosure. A liquid discharge apparatus 870 controls a pump 1810 and control valves 1811 and 1812 to circulate a liquid composition through a discharge head 1806 including the liquid discharge head 10 described above, a tank 1807, and a tube 1808. The liquid discharge apparatus 870 further includes an external tank 1813. The liquid composition can be supplied from the external tank 1813 to the tank 1807 by controlling the pump 1810, the control valves 1811 and 1812, and a valve 1814 when the amount of the liquid composition in the tank 1807 decreases. When the electrode manufacturing apparatus according to the present embodiment is used, the liquid composition can be discharged to a target portion of the discharge target. The electrode composite layer can be suitably used, for example, as a part of the configuration of an electrochemical element. The configuration of the electrochemical element other than the electrode composite layer is not limited to any particular configuration and may be appropriately selected from known configurations. Examples thereof include a positive electrode, a negative electrode, and a separator.

In the embodiments of the present disclosure, the term "liquid discharge apparatus" includes a liquid discharge head and drives the liquid discharge head to discharge liquid. The term "liquid discharge apparatus" used here includes, in addition to apparatuses to discharge liquid to a medium onto which liquid can adhere, apparatuses to discharge the liquid into gas (air) or liquid.

The "liquid discharge apparatus" may further include devices relating to feeding, conveying, and ejecting of the medium onto which liquid can adhere and also include, for example, a pretreatment device and an aftertreatment device. The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the medium onto which liquid can adhere include recording media, such as a sheet, recording paper, a recording sheet, a film, and cloth, electronic components, such as an electronic substrate and a piezoelectric element, and media, such as a powder layer, an organ model, and a testing cell. The medium includes any medium onto which liquid adheres unless otherwise specified.

Examples of materials of the "medium onto which liquid can adhere" include any materials to which liquid can adhere even temporarily, such as paper, thread, fiber, fabric, leather, metal, plastic, glass, wood, ceramic, a current collector such as an aluminum foil or a copper foil, and an electrode in which an active material layer is formed on the current collector.

Further, the term "liquid" is not limited to a particular liquid and includes any liquid having a viscosity or a surface tension that can be discharged from the head. However, preferably, the viscosity of the liquid is not greater than 30 (milli-pascal) mPa·s under ordinary temperature and ordinary pressure or by heating or cooling. Examples of the liquid include a solution, a suspension, or an emulsion that contains, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; an edible material, such as a natural colorant; an active material and a solid electrolyte used as an electrode material; or ink containing a conductive material or an insulating material. Such a solution, a suspension, or an emulsion can be used for, e.g., coating paint, inkjet ink, surface treatment solution, a liquid for forming components of an electronic element or light-emitting element or a resist pattern of electronic circuit, a material solution for three-dimensional fabrication, an electrode, or an electrochemical element.

The term "liquid discharge apparatus" may be an apparatus in which the liquid discharge head and the medium onto which liquid can adhere move relative to each other. However, the liquid discharge apparatus is not limited to such an apparatus. For example, the liquid discharge apparatus may be a serial head apparatus that moves the head or a line head apparatus that does not move the head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The "liquid discharge apparatus" is not limited to a stationary apparatus. The liquid discharge apparatus may be, for example, a robot which is equipped with a liquid discharge head and movable by remote control or autonomous driving. The movable robot can paint the outer wall of a building and paint a road marking (e.g., a crosswalk, a stop line, and a speed limit) on a road. In this case, a building and a road are also included in the "medium onto which liquid can adhere."

The above-described embodiments of the present disclosure are examples, and the following aspects of the present disclosure can provide, for example, advantageous effects described below.

Aspect 1

A liquid discharge module includes: a nozzle plate (e.g., the nozzle plate 15, 15*e*, 15*h*, 15*i*, or 15*j*) having a nozzle hole (e.g., the nozzle 14) through which liquid (e.g., ink) is discharged; a housing (e.g., the housing 11) including a liquid chamber communicating with the nozzle hole, and supporting the nozzle plate; a valve (e.g., the needle valve 17) in the liquid chamber to contact a portion of the nozzle plate on a liquid chamber side to form a sealed portion (e.g., the sealed portion 17*b*) that seals the nozzle hole; and a mover (e.g., the piezoelectric element 18) to move (reciprocate) the valve between a position of contact with the nozzle plate and a position of separation from the nozzle plate. The nozzle hole has at least two spaces different in the inner diameter between the portion of the nozzle plate on the liquid chamber side and the portion of the nozzle plate on a discharge side.

In other words, a liquid discharge module includes a nozzle plate, a housing, a valve, and a mover. The nozzle plate has a first face, a second face opposite to the first face, and a nozzle hole through which a liquid is discharged from the second face. The nozzle hole has at least two different inner diameters between the first face and the second face. The housing has a liquid chamber facing the first face of the nozzle plate and communicating with the nozzle hole. The housing supports the nozzle plate. The valve is disposed in the liquid chamber. The valve contacts the first face of the nozzle plate to form a sealed portion between the valve and the nozzle plate to close the nozzle hole. The mover moves the valve in a contact-separation direction between a contact position at which the valve contacts the nozzle plate and a separation position at which the valve is separated from the nozzle plate.

In embodiments of the present disclosure, examples of the nozzle plate include the nozzle plate 15, the combination of the nozzle-plate formation members 15*b* and 15*c*, the nozzle plate 15*e*, the combination of the nozzle-plate formation members 15*b* and 15*f*, the combination of the nozzle-plate formation members 15*h* and 15*i*, the nozzle plate 15*j*, and the combination of the nozzle-plate formation members 15*k* and 15*i*. These nozzle plates are collectively referred to as the nozzle plate (15) in the attached claims.

Aspect 2

In the liquid discharge module according to Aspect 1, the valve includes: a seal member (e.g., the seal member 17*a*, 17*c*, 17*d*, or 17*e*) to form the sealed portion; and a needle having a leading end supporting the seal member. The leading end is located on the nozzle hole side of the needle, and the sealing member includes an elastic member.

In other words, the valve includes: an elastic seal to elastically contact the first face of the nozzle plate to form the sealed portion; and a needle supporting the elastic seal at a leading end of the needle adjacent to the nozzle hole.

Aspect 3

In the liquid discharge module according to Aspect 1 or 2, the sealed portion is located (formed) outside a largest inner diameter of the nozzle hole.

Aspect 4

In the liquid discharge module according to any one of Aspects 1 to 3, the nozzle hole has a first inner space (e.g., R2) and a second inner space (e.g., R1) larger in inner diameter than the first inner space, the first inner space has a first inner wall as a wall, the second inner space has a second inner wall as a wall, a length of the second inner wall in a direction in which the valve reciprocates is longer than a length of the first inner wall in the direction in which the valve reciprocates.

In other words, the nozzle hole has a first inner wall and a second inner wall. The first inner wall has a first inner diameter and a first length in the contact-separation direction. The second inner wall has a second inner diameter larger than the first inner diameter and a second length longer than the first length in the contact-separation direction.

Aspect 5

In the liquid discharge module according to Aspect 4, the first inner wall is parallel to the direction in which the valve reciprocates, and the second inner wall is continuous to the first inner wall at a predetermined angle (e.g., θ) with respect to the direction in which the valve reciprocates.

In other words, the first inner wall extends in a direction parallel to the contact-separation direction, and the second inner wall is inclined toward the first inner wall at a predetermined angle and connected to the first inner wall.

Aspect 6

In the liquid discharge module according to Aspect 4 or 5, the first inner wall is provided on the discharge side of the second inner wall, and the second inner wall has an inner diameter increasing in a direction toward the liquid chamber side.

In other words, the first inner wall is closer to the second face than the second inner wall, and the second inner diameter increases toward the first face.

Aspect 7

In the liquid discharge module according to Aspect 4, the first inner wall and the second inner wall are parallel to the direction in which the valve reciprocates.

In other words, the first inner wall and the second inner wall extend in a direction parallel to the contact-separation direction.

Aspect 8

In the liquid discharge module according to Aspect 4, the second inner wall is provided on the liquid chamber side of the first inner wall.

In other words, the second inner wall is closer to the first face than the first inner wall.

Aspect 9

In the liquid discharge module according to Aspect 4, the second inner wall is provided on the discharge side of the first inner wall, and the second inner wall slants in the direction in which the valve reciprocates such that the second inner wall has an inner diameter decreasing in a direction toward the liquid chamber side.

In other words, the second inner wall is closer to the second face than the first inner wall, and the second inner diameter decreases toward the first face.

Aspect 10

In the liquid discharge module according to any one of Aspects 4 to 9, the nozzle plate includes: a first component (e.g., the nozzle-plate formation member 15*b*, 15*i*) having the first inner wall; and a second component (e.g., a nozzle-plate formation member 15*c*, 15*f*, 15*h*, or 15*k*) having the second inner wall, and the first component and the second component are arranged in the direction in which the valve reciprocates.

In other words, the nozzle plate includes a first component having the first inner wall and a second component joined to the first component in the contact-separation direction and having the second inner wall.

Aspect 11

In the liquid discharge module according to Aspect 10, the first component and the second component are joined together.

In other words, the first component and the second component are joined to each other to form a single unit.

Aspect 12

In the liquid discharge module according to Aspect 2, the seal member has a recess on the nozzle plate side.

In other words, the elastic seal has a recess facing the nozzle plate.

Aspect 13

In the liquid discharge module according to any one of Aspects 1 to 12, the sealed portion is located, at a predetermined distance from the nozzle hole, on a portion of the nozzle plate on the liquid chamber side.

In other words, the sealed portion on the first face is disposed away from the nozzle hole on the second face for a predetermined distance equal to a sum of the first length of the first inner wall and the second length of the second inner wall.

Aspect 14

In the liquid discharge module according to any one of Aspects 1 to 13, the housing includes a side wall member (e.g., the housing 11, 11*b*, or 11*d*) forming a side wall of the liquid chamber. The portion of the nozzle plate on the liquid chamber side and a face of the side wall member on the nozzle plate side are joined around the liquid chamber. The side wall member has an end portion, on the nozzle plate side, provided with a projection protruding inside the liquid chamber.

In other words, the housing (11) has a side wall defining the liquid chamber and an end face joined to the first face of the nozzle plate around the liquid chamber. The side wall has a projection adjacent to the end face of the housing, and the projection projects toward an interior of the liquid chamber.

Aspect 15

A liquid discharge head (e.g., the liquid discharge head 10 or the head 100) includes the liquid discharge module (e.g., the liquid discharge module 30) according to any one of Aspects 1 to 14, in which the liquid discharge module includes a plurality of liquid discharge modules.

In other words, a liquid discharge head includes multiple liquid discharge modules including the liquid discharge module according to any one of claims 1 to 14.

Aspect 16

A liquid discharge apparatus includes the liquid discharge head according to Aspect 15.

In other words, a liquid discharge apparatus includes the liquid discharge head according to Aspect 15 and a head holder holding the liquid discharge head to move the liquid discharge head.

As described above, according to one aspect of the present disclosure, a liquid discharge head having high durability can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge module comprising:

a nozzle plate including:

a first face;

a second face opposite to the first face; and a nozzle hole through which a liquid is discharged from the second face, the nozzle hole including at least two different inner diameters between the first face and the second face;

a housing including a liquid chamber:

facing the first face of the nozzle plate; and communicating with the nozzle hole, the housing supporting the nozzle plate;

a valve in the liquid chamber, the valve to contact the first face of the nozzle plate to form a sealed portion between the valve and the nozzle plate to close the nozzle hole, wherein the valve includes:

an elastic seal to elastically contact the first face of the nozzle plate to form the sealed portion, and a needle supporting the elastic seal at a leading end of the needle adjacent to the nozzle hole; and a mover to move the valve in a contact-separation direction between:

a contact position at which the valve contacts the nozzle plate; and a separation position at which the valve is separated from the nozzle plate, wherein the elastic seal includes a recess facing the nozzle plate, the liquid discharge module further comprising:

a bearing disposed between the valve and the housing; and a sealer disposed between the bearing and the valve.

2. The liquid discharge module according to claim 1, wherein:

the sealed portion is outside a largest inner diameter of the nozzle hole.

3. The liquid discharge module according to claim 1, wherein the nozzle hole includes:

a first inner wall including:

a first inner diameter; and a first length in the contact-separation direction; and a second inner wall including:

a second inner diameter larger than the first inner diameter; and a second length longer than the first length in the contact-separation direction.

4. The liquid discharge module according to claim 3, wherein:

the first inner wall extends in a direction parallel to the contact-separation direction, and the second inner wall is inclined toward the first inner wall at a predetermined angle and connected to the first inner wall.

5. The liquid discharge module according to claim 4, wherein:

the first inner wall and the second inner wall meet at an obtuse angle.

6. The liquid discharge module according to claim 3, wherein:

the first inner wall is closer to the second face than the second inner wall, and the second inner diameter increases toward the first face.

7. The liquid discharge module according to claim 3, wherein:

the first inner wall and the second inner wall extend in a direction parallel to the contact-separation direction.

8. The liquid discharge module according to claim 3, wherein:

the second inner wall is closer to the first face than the first inner wall.

9. The liquid discharge module according to claim 3, wherein:

the second inner wall is closer to the second face than the first inner wall, and the second inner diameter decreases toward the first face.

10. The liquid discharge module according to claim 3, wherein the nozzle plate includes:

a first component including the first inner wall; and a second component joined to the first component in the contact-separation direction and including the second inner wall.

11. The liquid discharge module according to claim 10, wherein:

the first component and the second component are joined to each other to form a single unit.

12. The liquid discharge module according to claim 3, wherein:

the sealed portion on the first face is disposed away from the nozzle hole on the second face for a predetermined distance equal to a sum of the first length of the first inner wall and the second length of the second inner wall.

13. The liquid discharge module according to claim 3, wherein:

the second length is longer than the first length.

14. The liquid discharge module according to claim 1, wherein the housing includes:

a side wall defining the liquid chamber; and an end face joined to the first face of the nozzle plate around the liquid chamber, wherein:

the side wall includes a projection adjacent to the end face of the housing, and the projection projects toward an interior of the liquid chamber.

15. A liquid discharge head comprising multiple liquid discharge modules including the liquid discharge module according to claim 1.

16. A liquid discharge apparatus comprising:

the liquid discharge head according to claim 15; and a head holder holding the liquid discharge head to move the liquid discharge head.

17. The liquid discharge module according to claim 1, wherein:

the recess includes a tapered shape.

18. The liquid discharge module according to claim 1, wherein:

the mover comprises a piezoelectric element; and the valve is connected to the piezoelectric element via a holder.

19. A liquid discharge module comprising:

a nozzle plate including:

a first face;

a second face opposite to the first face; and a nozzle hole through which a liquid is discharged from the second face, the nozzle hole including at least two different inner diameters between the first face and the second face;

a housing including a liquid chamber:

facing the first face of the nozzle plate; and communicating with the nozzle hole, the housing supporting the nozzle plate;

a valve in the liquid chamber, the valve to contact the first face of the nozzle plate to form a sealed portion between the valve and the nozzle plate to close the nozzle hole, wherein the valve includes:

an elastic seal to elastically contact the first face of the nozzle plate to form the sealed portion, and a needle supporting the elastic seal at a leading end of the needle adjacent to the nozzle hole; and a mover to move the valve in a contact-separation direction between:

a contact position at which the valve contacts the nozzle plate; and a separation position at which the valve is separated from the nozzle plate, wherein the elastic seal includes a recess facing the nozzle plate, the liquid discharge module further comprising:

a restrictor attached to the housing, wherein the mover is fixed by the restrictor on an end side opposite to the valve.

* * * * *